(12) United States Patent
Wright et al.

(10) Patent No.: US 8,436,872 B2
(45) Date of Patent: May 7, 2013

(54) SYSTEM AND METHOD FOR CREATING AND DISPLAYING MAP PROJECTIONS RELATED TO REAL-TIME IMAGES

(75) Inventors: William Wright, Toronto (CA); Thomas Kapler, Toronto (CA); Robin Senior, Toronto (CA)

(73) Assignee: Oculus Info Inc., Toronto (CA)

( * ) Notice: Subject to any disclaimer, the term of this patent is extended or adjusted under 35 U.S.C. 154(b) by 697 days.

(21) Appl. No.: 12/699,545

(22) Filed: Feb. 3, 2010

(65) Prior Publication Data
US 2011/0188760 A1 Aug. 4, 2011

(51) Int. Cl.
*G09G 5/00* (2006.01)

(52) U.S. Cl.
USPC .......................................... 345/633; 345/634

(58) Field of Classification Search .................. None
See application file for complete search history.

(56) References Cited

U.S. PATENT DOCUMENTS

| | | | |
|---|---|---|---|
| 2004/0107072 A1 | 6/2004 | Dietrich et al. | |
| 2004/0169653 A1* | 9/2004 | Endo et al. | 345/427 |
| 2005/0149262 A1* | 7/2005 | Oikubo | 701/211 |
| 2006/0041375 A1* | 2/2006 | Witmer et al. | 701/208 |
| 2006/0174211 A1* | 8/2006 | Hoellerer et al. | 715/782 |
| 2008/0186255 A1 | 8/2008 | Cohen et al. | |
| 2009/0028384 A1* | 1/2009 | Bovyrin et al. | 382/103 |
| 2009/0171580 A1* | 7/2009 | Nezu | 701/211 |
| 2009/0186629 A1* | 7/2009 | Soelberg et al. | 455/456.1 |
| 2010/0328344 A1* | 12/2010 | Mattila et al. | 345/633 |

FOREIGN PATENT DOCUMENTS

WO 2005057133 A1 6/2005

OTHER PUBLICATIONS

Piekarski, W. and Thomas, B.H., Interactive Augmented Reality Techniques for Construction at a Distance of 3D Geometry, Zurich, Switzerland, May 2003. Website: www.tinmith.net.
Presselite iPhone Application, Jan. 16, 2010. Website: www.presselite.com/.
International Search Report issued by the Canadian Intellectual Property Office dated Apr. 19, 2011 for corresponding International Application No. PCT/CA2011/000043 filed Jan. 17, 2011.
Written Opinion of the International Searching Authority issued by the Canadian Intellectual Property Office dated Apr. 19, 2011 for corresponding International Application No. PCT/CA2011/000043 filed Jan. 17, 2011.
JALOPNIK.COM Website, "NYC Horizonless Map Projection Is Tripping Us Out", Jan. 24, 2010, http://jalopnik.com/5453688/nyc-horizonless-map-projection-is-tripping-us-out.

(Continued)

*Primary Examiner* — James A Thompson
*Assistant Examiner* — David H Chu
(74) *Attorney, Agent, or Firm* — Gowling Lafleur Henderson LLP; Aaron Edgar

(57) ABSTRACT

There is provided a method and system for creating and displaying a map projection of a device's real-time viewing area to depict virtual objects, the virtual objects providing a reflected view of real-time objects displayed within the device's viewing area, the method comprising: displaying a real-time image of the device's viewing area taken from a geographical location on a display; retrieving the map projection for revealing the reflected view as an elevated view of a ground surface about the device's current geographical location and in accordance with the device's viewing area; superimposing the map projection on the display and overlaid in an upper portion of the real-time image; and defining one or more markers configured to show a relationship between the map projection and the real-time image, each marker overlaid on the display and configured to connect between the virtual object in the map projection and the corresponding real-time object on the real-time image.

20 Claims, 22 Drawing Sheets

OTHER PUBLICATIONS

JALOPNIK.COM Website, "Wierd Alternative Map Projections", Jan. 2, 2010, http://jalopnik.com/5436508/weird-alternative-map-projections.

BERGLONDON.COM Website, "Here & There—a horizonless projection in Manhattan", Nov. 26, 2009, http://berglondon.com/projects/hat/.

* cited by examiner

SYSTEM AND METHOD FOR CREATING AND DISPLAYING MAP PROJECTIONS RELATED TO REAL-TIME IMAGES

FIELD OF THE INVENTION

This application relates to an interactive visual presentation of a map projection on a user interface. Specifically, the application relates to a system and method for displaying a map projection on a user interface for depicting a reflected view of real-time objects displayed within a user/device's viewing area.

BACKGROUND OF THE INVENTION

Currently, there exists many navigation systems that provide information about a user's surroundings and geographical information. Some GPS navigation systems appear as an animated 2D image on a specific device such as a BlackBerry®, iPhone®, cell phone or a specific GPS device such as Garmin®. These 2D systems are designed to provide navigation information on an animated street map view. The GPS systems can provide a street view, a satellite view and a hybrid view of a map. However, it can be distracting for a user to view their surroundings while looking at a secondary device. It can also be disorienting for a user to try to relate the animated map view to the real world images seen by the user and attempt navigation at the same time. As well, these GPS devices/applications provide a limited amount of information about the user's surroundings. For example, they may provide an animated street map view, a compass, and directional information to navigate the user to a desired location.

There are also some 3D GPS systems that provide a limited amount of navigation information on windshields of vehicles or airplanes. Such navigation systems referred to as heads up displays, project basic directional information for guiding a user regarding their current location and/or destination location. For example, in one case a virtual cable line is projected on a windshield to show the direction which the user should navigate on the highway. Alternatively, a 3D compass is projected onto the window of a fighter plane to show the current position, altitude and bearing of the plane to allow a pilot to know which direction they are facing.

Generally, augmented reality (AR) is a term for a live view of a physical real-world environment whose elements are merged with virtual computer-generated imagery—creating a mixed reality. The computer-generated images are displayed as a layer over a user's view of the physical world. With this extra information presented to the user, the physical world can be enhanced or augmented beyond the user's normal experience. AR systems are also now in everyday use on mobile devices, such as iPhone® and BlackBerry® devices, where the device's screen is used to show merged live video from its camera with virtual elements placed on the display. Navigation using Augmented Reality methods typically is done using annotations and text descriptions on the live scene to provide information about the physical world. However, this approach occludes the live scene and provides a limited amount of information about the physical world. Further, it is difficult for a user to relate the virtual imagery to the physical world.

Accordingly, the existing GPS systems present limited amount of information about a user's surroundings and present difficulties for a user to navigate to a desired location while referring to and trying correlate an animated map view on a GPS device screen to the real-world.

SUMMARY OF THE INVENTION

According to one aspect there is provided a navigation system that provides correlation between real-world images and virtual map images and allows improved navigation. The virtual map images include for example, virtual aerial and/or satellite imagery, raster or vector map images. According to the present aspect, the navigation system displays a map projection comprising a reflected virtual view of real-time objects seen within a user/device's viewing area to aid in navigation and improve understanding of the current surroundings.

According to one aspect there is provided a method for creating and displaying a map projection of a device's real-time viewing area to depict virtual objects providing a reflected view of real-time objects within the device's viewing area, the method comprising: displaying a real-time image of the device's viewing area taken from a geographical location on a display; retrieving the map projection for revealing the reflected view as an elevated view of a ground surface about the device's current geographical location and in accordance with the device's viewing area; superimposing the map projection on the display in an upper portion of the real-time image; and defining one or more markers configured to show a relationship between the map projection and the real-time image, each marker overlaid on the display and configured to connect between the virtual object in the map projection and the corresponding real-time object on the real-time image. According to one aspect, the map projection includes aerial and/or satellite imagery, a raster or a vector map projection.

According to a further aspect of the invention, there is provided a method and system for transforming the map projection. The map projection displays a reflected view of real-time objects in the real-time plane. The map projection is transformed to a surface having one of a parabolic curve surface, an arcuate surface, a flat surface, an angled planar surface, a surface of revolution curve, a surface shifted relative to the real-time objects displayed, a surface having at least a portion thereof magnified relative to the map projection, a surface having at least a portion thereof compressed relative to the map projection, a surface having a subset of virtual objects provided in the map projection. The selection of the transform being based on pre-defined criteria (i.e. user preferences for providing improved visibility of certain virtual objects or focusing on a specific region of the virtual objects).

BRIEF DESCRIPTION OF THE DRAWINGS

A better understanding of these and other embodiments of the present invention can be obtained with reference to the following drawings and detailed description of the preferred embodiments, in which.

DETAILED DESCRIPTION OF THE PREFERRED EMBODIMENTS

Data Processing System 100

Figure 1A:
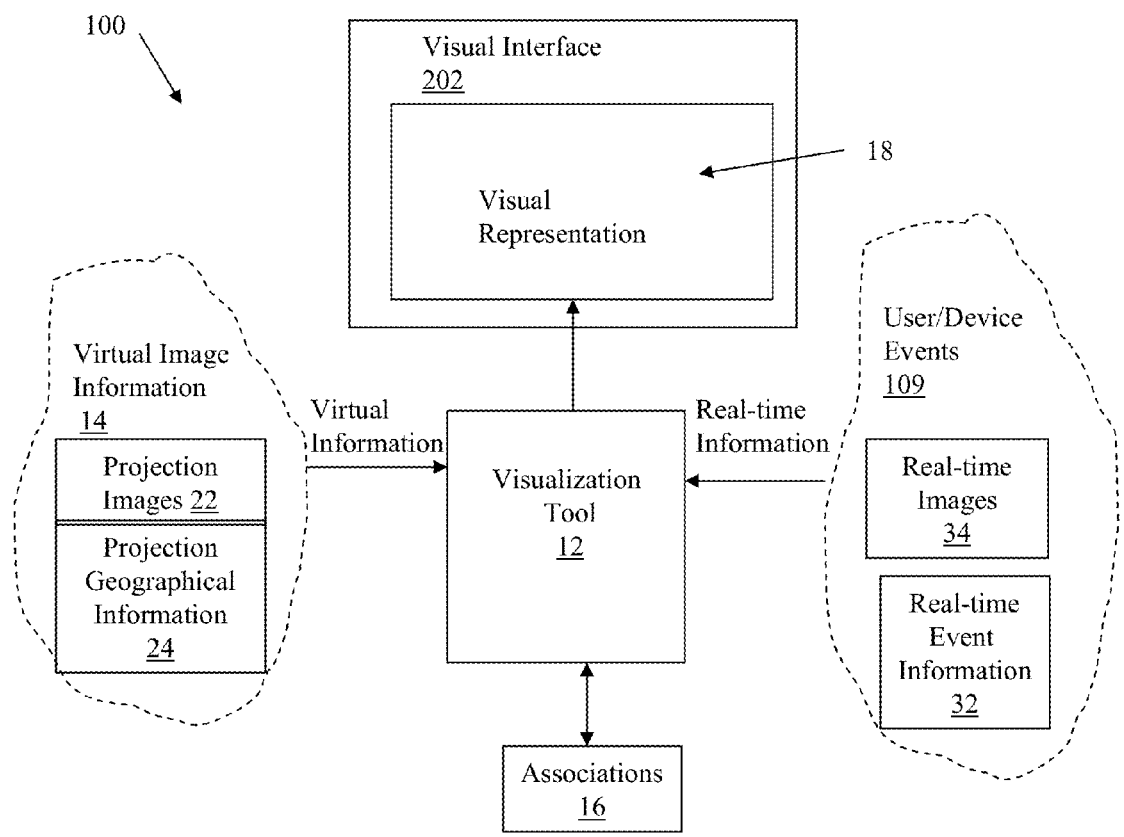
FIG. 1A is a block diagram of a data processing system for a visualization tool and FIG. 1B is a block diagram of further details.

Referring to FIG. 1A, a visualization data processing system 100 includes a visualization tool 12 for retrieving and processing a collection of virtual image information 14 as input data elements to a user interface 202. The virtual image information 14 provides satellite and/or aerial imagery as projection images 22 (also referred to as map projections or virtual images herein). The virtual image information 14 further provides geographical information 24 associated with the projection images 22. The geographical information 24 can include, for example, location information associated with the projected images 22, names of locations within the projection images, or other characterizing information, physical characteristics of objects within the projection images 22. The geographical information 24 can include any information that may be used for example, in graphical information systems (GIS). The visualization tool 12 is further configured for processing user/device events 109. The user/device events 109 comprise real-time images 34 that are viewed/captured by a device 101 (see FIG. 1B) as the location of the device 101 changes. The real-time images 34 may also be referred to as images captured within the device's 101 viewing area. The user/device events 109 further comprise real-time event information 32 that defines any temporal and spatial information related to the real-time images 34 viewed or captured at a predefined instance. For example, the real-time event information 32 may provide information about the device's 101 current location, facing direction, distance to one or more pre-defined real-time objects, landmarks within and outside the device's 101 current viewing area, physical characteristics (i.e. dimensions) of objects within the viewing area, distances between objects in the viewing area, distance between a user/device's current positioning to one or more objects in the real-time viewing area.

The event information 32 may further include information about locations on the real-time image where there is a lack of objects (i.e. determining an upper portion of the real-time image where there are no buildings, trees, people or other objects). This determination of a lack of objects may be used to define a location (i.e. an upper portion of the real-time image) where the projections image may be overlaid without blocking any objects.

Associations 16

The virtual image information 14 can be combined with a respective set of associations 16 which define relationships of the projected images 22 and real-time images 34 by the tool 12 to generate an interactive visual representation 18 on the visual interface (VI) 202. The set of associations 16 may be predefined by a user (i.e. analyst) of the tool 12 to define relationships between the virtual image information 14 and real-time images 34 provided by user events 109. Alternatively, the set of associations 16 may be generated by the tool 12 based on projection geographical information 24 (i.e. location of virtual objects) and real-time event information 32 (i.e. estimated location of real-time objects) related to the real-time images 34 captured. The associations 16 may be generated by the tool 12 for example to link one or more objects in the device's 101 viewing area (the objects captured in real-time images 34) to corresponding virtual objects within the projection images 22. The associations 16 are displayed on the visual representation 18 as markers connected between a virtual object in the projection image 22 and a corresponding real-time object in the real-time image 34. As will be described, the markers can alternatively be colour coded or otherwise visually emphasized to distinguish associations between real-time objects and virtual objects. As will be described below, the associations 16 are made by correlating the estimated geographic location of each real-time object (provided by the real-time event information 32) to the geographical location of each virtual object (provided by the projection geographical information 24). The definition of associations 16 may be user dependent, semi automated (i.e. defined by the tool 12 but modifiable by a user of the device 101 or fully automated (i.e. fully defined by the tool 12).

Management of the virtual image information 14, tool 12, and associations 16 are driven by updated user events 109 of a user (not shown) of the tool 12. The user events 109 comprise real-time images 34 captured and updated as the location of the device 101 (FIG. 1B) changes. The user events 109 further comprise event information 32 defining location and other GIS information related to each real-time image 34. Alternatively, the user events 109 may be updated by interaction of a user (not shown) with the user interface 108 (see FIG. 1B) during interaction with the visual representation 18. As will be described, the visual representation 18 shows connectivity between the projection images 22 and the real-time images 34.

Data Processing System 100

Figure 1B:
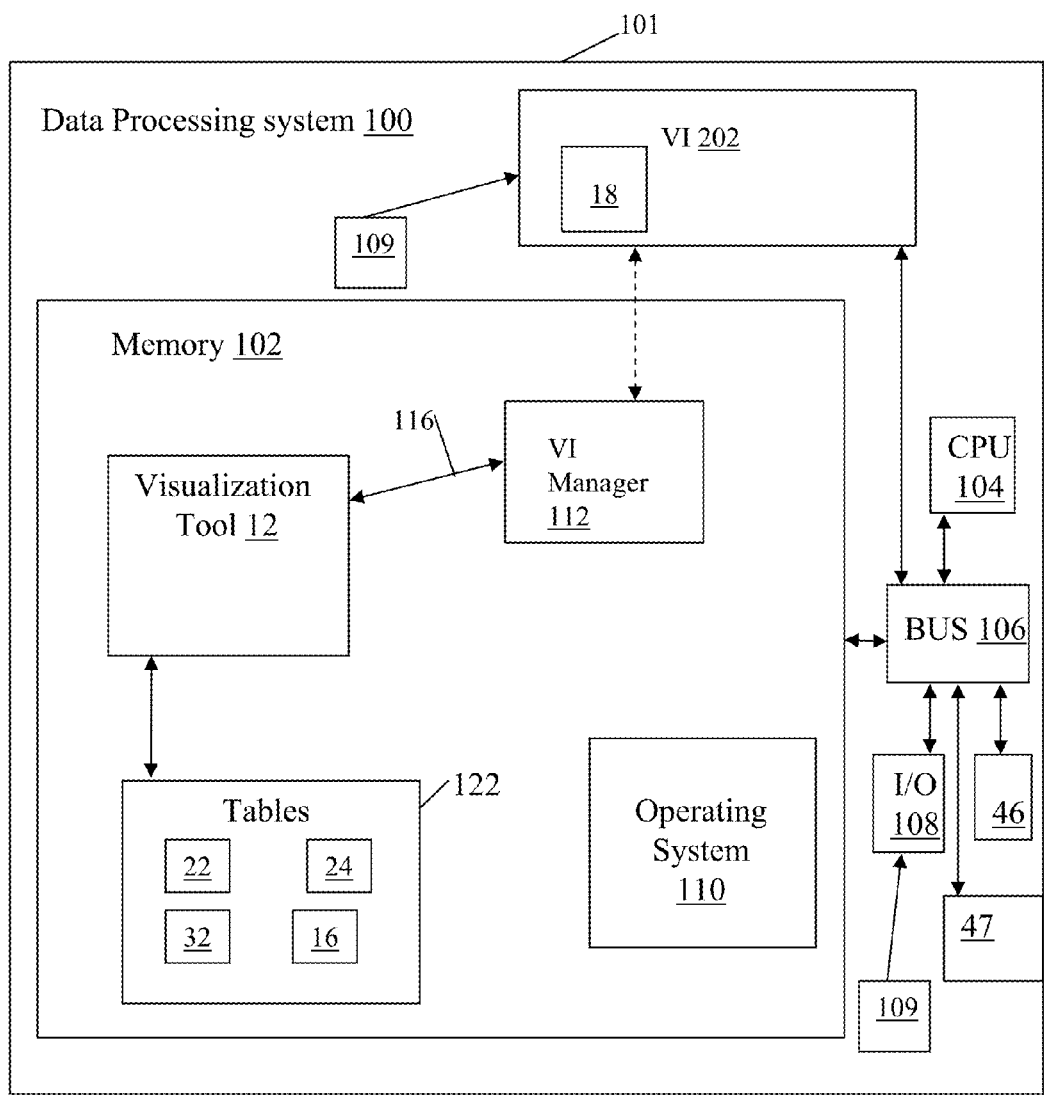

Referring to FIG. 1B, the data processing system 100 of a device 101 includes the user interface device(s) 108 for interacting with the tool 12, the user interface device(s) 108 being connected to a memory 102 via a BUS 106. The device 101 comprises a computing device and may include for example a laptop or desktop computer, a mobile phone, a Personal Digital Assistant (PDA), virtual reality goggles, monocle, heads-up display systems, virtual reality device other types of computing devices as will be envisaged by a person skilled in the art. The interface device(s) 108 are coupled to a processor 104 via the BUS 106, to interact with user events 109 to monitor or otherwise instruct the operation of the tool 12 via an operating system 110. The user interface device(s) 108 can include one or more user input devices such as but not limited to a QWERTY keyboard, a keypad, a trackwheel, a stylus, a mouse, a microphone, a digital compass and an accelerometer. The visual interface 202 is considered to be a user output device, such as but not limited to a computer screen display, a mobile device display (such as a cell phone screen), goggles having a screen display (such as a virtual reality goggles). If the screen is touch sensitive, then the display can also be used as a user input device as controlled by the processor 104. Further, it is recognized that the data processing system 100 can include a computer readable storage medium 46 coupled to the processor 104 for providing instructions to the processor 104 and/or the tool 12. The computer readable medium 46 can include hardware and/or software such as, by way of example only, magnetic disks, magnetic tape, optically readable medium such as CD/DVD ROMS, and memory cards. In each case, the computer readable medium 46 may take the form of a small disk, floppy diskette, cassette, hard disk drive, solid-state memory card, or RAM provided in the memory 102. It should be noted that the above listed example computer readable mediums 46 can be used either alone or in combination. System 100 further comprises a network interface 47 comply the system 100 for communication with one or more public or private networks searches a LAN and/or the Internet.

Referring again to FIG. 1B, the tool 12 interacts via link 116 with a VI manager 112 (also known as a visualization renderer) of the system 100 for presenting the visual representation 18 on the visual interface 202. The tool 12 processes virtual image information 14, associations 16, and user events 109 from data files or tables 122 of the memory 102. As described above, the associations 16 may either be user-defined, or provided by the tool 12 (or a combination thereof). If the tool 12 provides the associations 16, the associations 16 are determined based on analyzing the location of real-time objects (as provided by event information 32 for example by determining the distance between the real-time objects and the device 101 and determining the location of the real-time object by knowing the current location of the device 101. The tool 12 then processes the information received from the tables 122 for subsequent presentation on the visual representation 18. It is recognized that the virtual image information 14, associations 16 and the user events 109 could be stored in the same or separate tables 122, as desired. The tool 12 can receive requests for storing, retrieving, amending, or creating the virtual image information 14, associations 16 via the tool 12 and/or directly via link 120 from the VI manager 112, as driven by the user events 109 and/or independent operation of the tool 12. Accordingly, the tool 12 and manager 112 coordinate the processing of data objects 14, association set 16 and user events 109 with respect to the content of the screen representation 18 displayed in the visual interface 202.

As will be understood by a person skilled in the art, the visualization tool 12 and the visual interface 202 may exist on separate devices (not shown) such that the process of creating the map projection is performed on a first device and the second device is used to render the map projection and the real-time image on the display.

The task related instructions can comprise code and/or machine readable instructions for implementing predetermined functions/operations including those of an operating system, tool 12, or other information processing system, for example, in response to command or input provided by a user of the system 100. The processor 104 (also referred to as module(s) for specific components of the tool 12) as used herein is a configured device and/or set of machine-readable instructions for performing operations as described by example above.

As used herein, the processor/modules in general may comprise any one or combination of, hardware, firmware, and/or software. The processor/modules acts upon information by manipulating, analyzing, modifying, converting or transmitting information for use by an executable procedure or an information device, and/or by routing the information with respect to an output device. The processor/modules may use or comprise the capabilities of a controller or microprocessor, for example. Accordingly, any of the functionality provided by the systems and process of the accompanying figures may be implemented in hardware, software or a combination of both. Accordingly, the use of a processor/modules as a device and/or as a set of machine readable instructions is hereafter referred to generically as a processor/module for sake of simplicity.

It will be understood by a person skilled in the art that the memory 102 storage described herein is the place where data is held in an electromagnetic or optical form for access by a computer processor. In one embodiment, storage means the devices and data connected to the computer through input/output operations such as hard disk and tape systems and other forms of storage not including computer memory and other in-computer storage. In a second embodiment, in a more formal usage, storage is divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be much faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

A database is a further embodiment of memory 102 as a collection of information that is organized so that it can easily be accessed, managed, and updated. In one view, databases can be classified according to types of content: bibliographic, full-text, numeric, and images. In computing, databases are sometimes classified according to their organizational approach. As well, a relational database is a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Computer databases typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory is a further embodiment of memory 102 storage as the electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in the computer.

Visualization Tool 12

Figure 2:
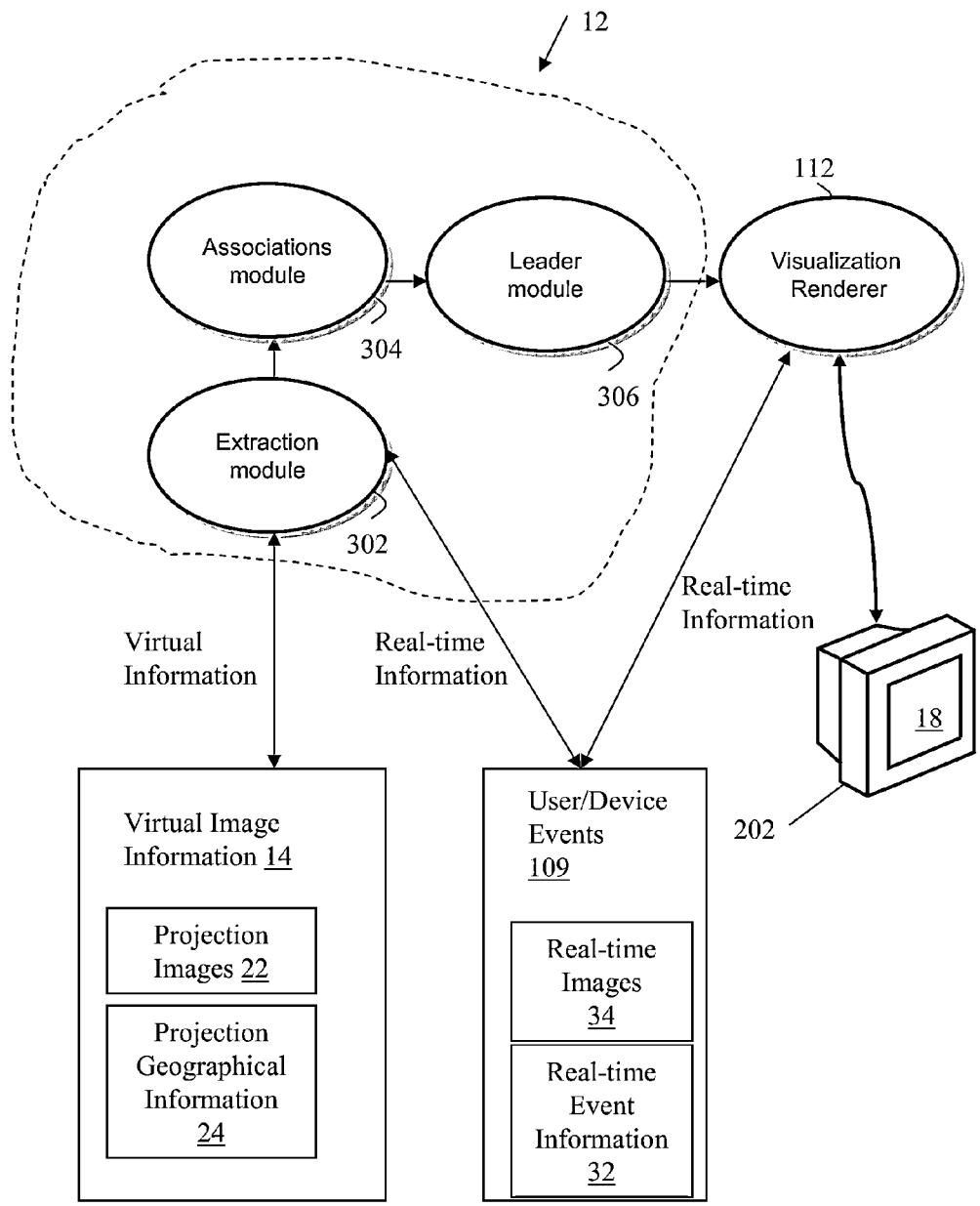
FIG. 2 is a block diagram of the visualization tool and associated components according to one embodiment.
Figure 15:
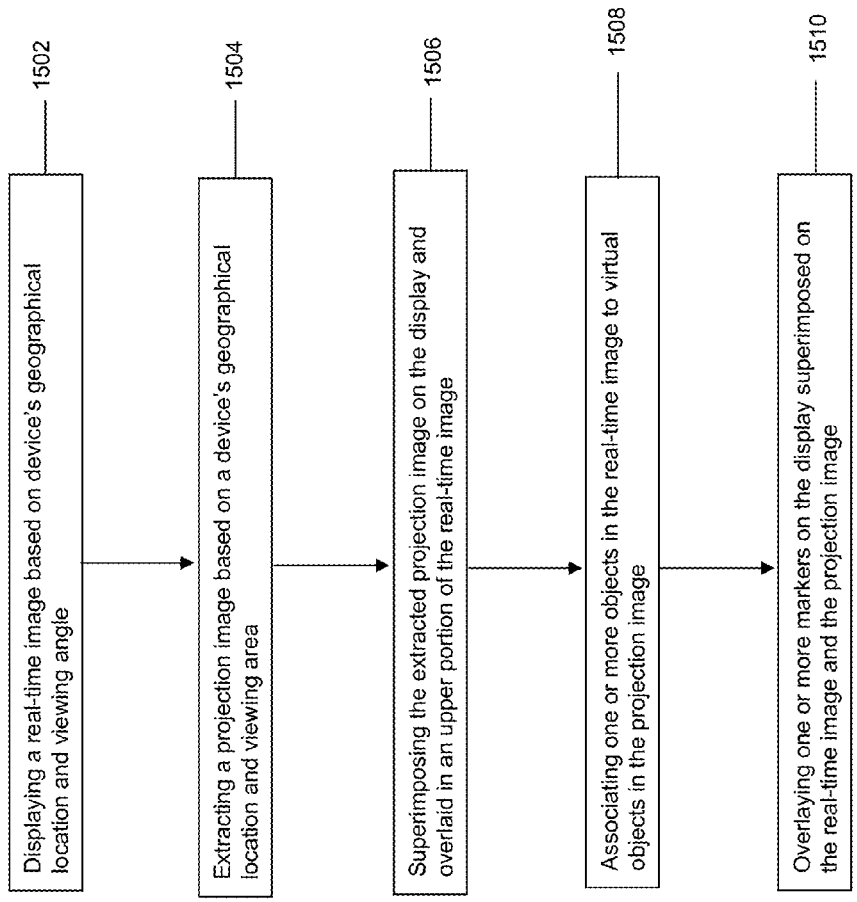
FIG. 15 is a schematic diagram illustrating the process for creating and displaying a map projection according to one embodiment.

Referring to FIGS. 2 and 15, shown is one embodiment of the visualization tool 12. In the present embodiment, the visualization tool 12 comprises an extraction module 302, an associations module 304, and a leader module 306. The visualization renderer 112 displays a real-time image 34 based on device 101 current geographical location, facing direction and viewing angle of the device 101 (step 1502). The extraction module 302 is configured for extracting projection images 22 based on user/device events 109 and real-time images 34 viewed by the device 101 (step 1504). As described herein, the projection images 22 provides a reflected view of objects seen in the real-time plane (real-time images 34). The projection images 22 may refer to satellite and/or aerial imagery and/or annotated vector graphics which provide a reflected view of objects in the real-time plane. The reflected view of objects provided by projection images 22 is taken from an elevated position about the device's 101 current geographical location and in accordance with the direction angle of the viewing area (as provided by event information 32). In one example, the reflected view 22 is a mirror image of the real-time objects in the real-time image 22 revealing a hidden view/angle of objects seen in the viewing area.

Thus, the user/device events 109 provide event information 32 which defines the geographical coordinates of the device 101 and other GIS information related to the device's 101 viewing area. The event information 32 can provide information defining the device 101 current location and facing direction as it captures real-time images 34 within its viewing area. Thus, the event information 32 can provide for example, the current location of the device 101, the direction the device 101 is facing, the estimated elevation of the device 101 relative to the surrounding ground surface, the estimated distance of the device 101 from surrounding objects and/or pre-defined landmarks associated with the real-time images 34. Accordingly, based on the device 101 current geographical location and viewing area (i.e. the facing direction of the device 101) provided by event information 32, the extracting module 302 retrieves the corresponding projection images 22 (also referred to as map projections) from the data store 122. The projection images 22 depict an elevated view of a ground surface about the device 101 current geographical location and in accordance with the device 101 viewing area (i.e. direction the device 101 is facing). In this way, the projection images 22 can comprise aerial and/or satellite imagery and/or annotated vector graphics which provide a reflected top view of the device's 101 viewing area in accordance with the device's current geographical co-ordinates. As will be described, in one embodiment, the projection images 22 allow a user of the device 101 to reveal portions of the real-time objects hidden (i.e. a top surface of the real-time objects not seen by the user) from the device 101 viewing area. The visualization renderer 112 is configured to display the projection image 22 on the display 18 and overlaid in an upper portion of the real-time image 34 (step 1506).

Once the projection images 22 are extracted, the associations module 304 is configured to associate real-time objects provided in real-time images 34 to virtual objects (also referred to as reflected objects) in projection images 22 (step 1508). The event information 32 provides estimated coordinates of one or more pre-defined real-time objects within the real-time image 34. The estimated coordinates of each real-time object may be calculated for example, using the device 101 current location and estimated distance to each real-time object (provided by event information 32). The projection geographical information 24 contains geographical coordinates of one or more virtual objects provided in projection images 22. Accordingly, the leader module 306 is configured to communicate with the visualization renderer 112 to display and overlay one or more markers for showing a relationship between virtual objects in the projection images 22 and real-time objects in real-time images 34. Each marker is overlaid on the display and configured to connect between a virtual object in the projection image 22 and a corresponding real-time object in real-time images 34 (step 1508). The relationships between the objects being defined by the associations module 304. The leader module 306 may further be configured to provide textual information characterizing the relationship between the projected images 22 and real-time images 34. The textual information may include for example identifiers showing current/destination locations, names of buildings, names of landmarks within the viewing area, directional information, etc. An example of textual information is shown in FIG. 4 where the identifier "My Location" is shown overlaid on the projected image 22 (shown as step 1510).

The leader module 306 is thus configured to render markers onto the scene (i.e. visualization representation 18), in communication with visualization renderer 112 connecting a physical object (i.e. an object in the real-time image 34) to its virtual representation (i.e. a virtual object in the projection image 22). The markers are overlaid such that they are placed on top of the real-time image 34 and the projection image 22 and extending therebetween. In one embodiment, the leader module 306 is provided information about the dimension and physical characteristics of one or more objects in the real-time image 34. Accordingly, in the present embodiment the leader module 306 uses the dimension information to determine the placement of the marker. For example, the marker may be drawn such that it extends from the virtual object to the top surface of the corresponding real-time object (i.e. the marker is drawn to a certain predefined height on the real-time image 34).

The visualization renderer 112 is further configured to visualize and display the real-time image 34, the projection image 22 and the one or more markers on the display 18. According to one embodiment, the visualization renderer 112 is configured to display the real-time image 34 on the display 18. The visualization renderer 112 is further configured to superimpose the projection image 22 in an upper portion of the real-time image 34. The visualization renderer 112 may further be configured to determine an area on the real-time image 34 that is less filled or less crowded with real-time objects for overlaying the projected image 22 therein.

Figure 4:
FIG. 4 is a representative screen shot of the visualization tool showing the projection image displayed on a real-time image and relationships therebetween in accordance with an embodiment thereof.

For example, referring to FIG. 4, the projection image 22 is overlaid in an upper portion of the real-time image 34 where there are less real-time objects (i.e. the projection image 22 is displayed on top of the sky portion of the real-time image 34 on the display 18.

The visualization renderer 112 is further configured to communicate with the leader module 306 and overlay the markers connecting objects within the displayed real-time image 34 to virtual objects in the displayed projected image 22.

Referring again to FIG. 4 there is illustrated an example screen shot of the visual representation 18. As seen in FIG. 4, the real-time image 34 depicts the device 101 viewing area taken from a specific geographical location and is displayed on the visual representation 18. The map projection 22 depicts an elevated view of a ground surface about the device's current geographical location and in accordance with the device's 101 viewing area (i.e. which direction and which angle the device is facing). This map projection 22 is overlaid on the real-time image 34 in an upper portion 410 thereof. As can be seen the map projection is overlaid in a manner to minimize blocking objects (i.e. 412) in the lower portion 414. As can be seen in FIG. 4, there are one or more markers 404 connecting virtual objects (i.e. 406) with real-time objects (i.e. 408). There is also a textual marker 402 showing the user's current location. In one embodiment, the one or more markers may be shown by colour coding the virtual object in the projected image 22 to the real-time object in image 34. For example, a specific building or landmark may have the same colour in the projection image 22 and the real-time image 34 as a way of showing their relationship.

Projection Images 22

Figure 10:
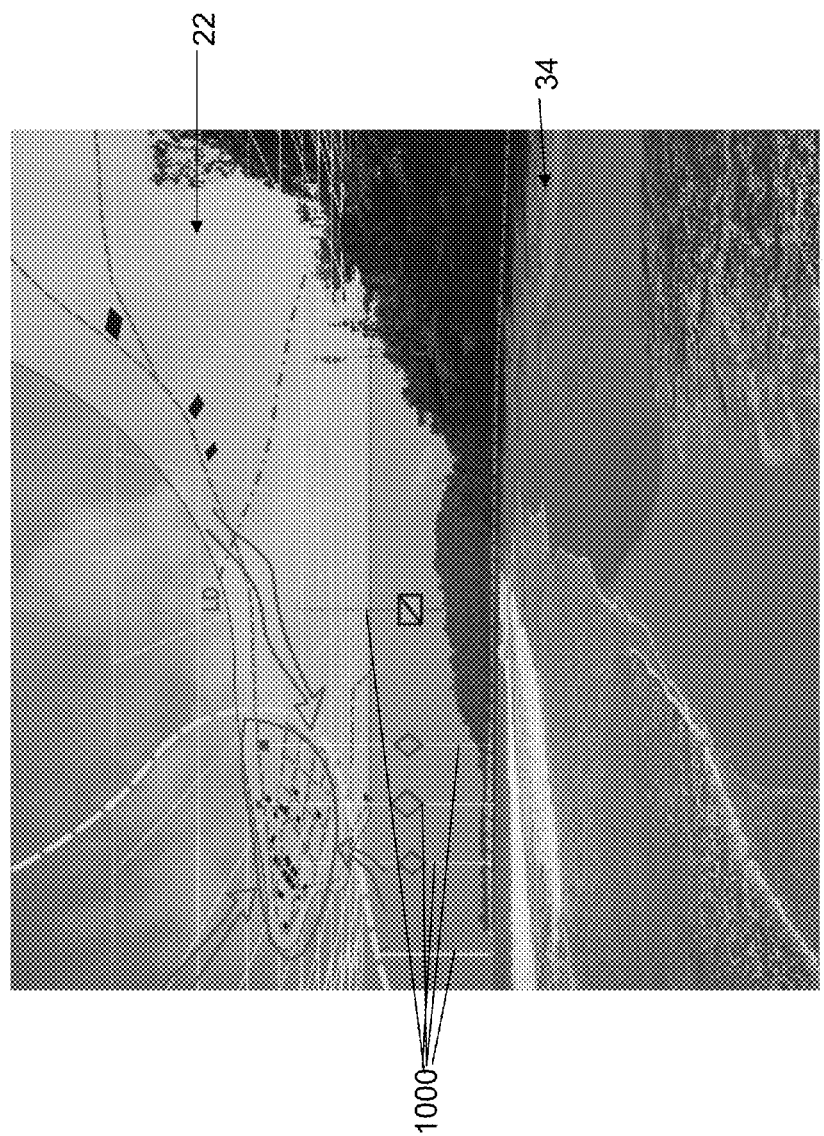
FIG. 10 is a representative screen shot of the visualization tool showing the projection image displayed on a real-time image using one or more of a vector map, vectors, annotations and symbols to represent the projected virtual image in accordance with one embodiment.

It is noted that the projection images 22 referred to herein, may include images such as aerial images and/or satellite images and/or annotated vector graphics depicting a top view of the ground surface about the device 101 geographical location. The projection images 22 may also contain other symbolic representations of map projections such as vectors, objects, user-defined/pre-defined/generated by tool 12 annotations, location specific annotation and images as may be understood by a person skilled in the art. The projection images 22 may also be transparent, semi-transparent or opaque and may be predefined by a user of the visualization tool 12. FIG. 10 illustrates an example screen shot of the visual representation 18 where the projection images 22 uses map symbols, vectors and annotations to indicate terrains, objects, different elevations and surfaces within the real-time image 34. In FIG. 10, one or more markers 1000 provided by the leader module 306 are used to correlate or associate objects within the real-time image 34 to the projection or virtual image 22. Referring to FIG. 10, the real-time image 34 is displayed underneath the projection image 22. Further, the projection image 22 is displayed in an upper portion 1004 of visual representation 18 (and overlaid on an upper portion of the real-time image 34). In the present example, the projection image 22 is semi-transparent such that the real-time image 34 is still visible.

According to the present embodiment, as the user of the device 101 moves the device 101 (i.e. the viewing screen) location or positioning, the visualization tool 12 determines that the location or viewing angle of the device 101 has been changed (i.e. via real-time event information 32). Thus, the visualization tool 12 extracts an updated projection image 22 based on the updated coordinates of the device 101 and determines updated associations 16. The visualization tool 12 further communicates with visualization renderer 112 to display an updated real-time image 34, an updated projection image 22 and one or more markers showing the relationships therebetween on the display 18. Thus, the display 18 is updated in real-time to provide the user of the device 101 with a live map.

According to one embodiment, the visual interface 202 allows a user to provide external data sources (via user interface 108) to include non-geographical features such as colleagues, enemies, events or other physical entities on the display 18. In one embodiment, the user interface 108 is configured to allow communication with the tool 12 for a user to add objects and to manipulate the virtual projection image 22. In a further embodiment, the user interface 108 is further configured to interact with a user to allow placement and modification of at least one of the one or more markers, annotations, vectors, and symbols. As described herein each of the one or more markers, annotations, vectors and symbols may be configured for defining a relationship between the map projection and the real-time image such as to still allow visibility of the real-time image and the map projection.

Transform Module 308

Figure 3:
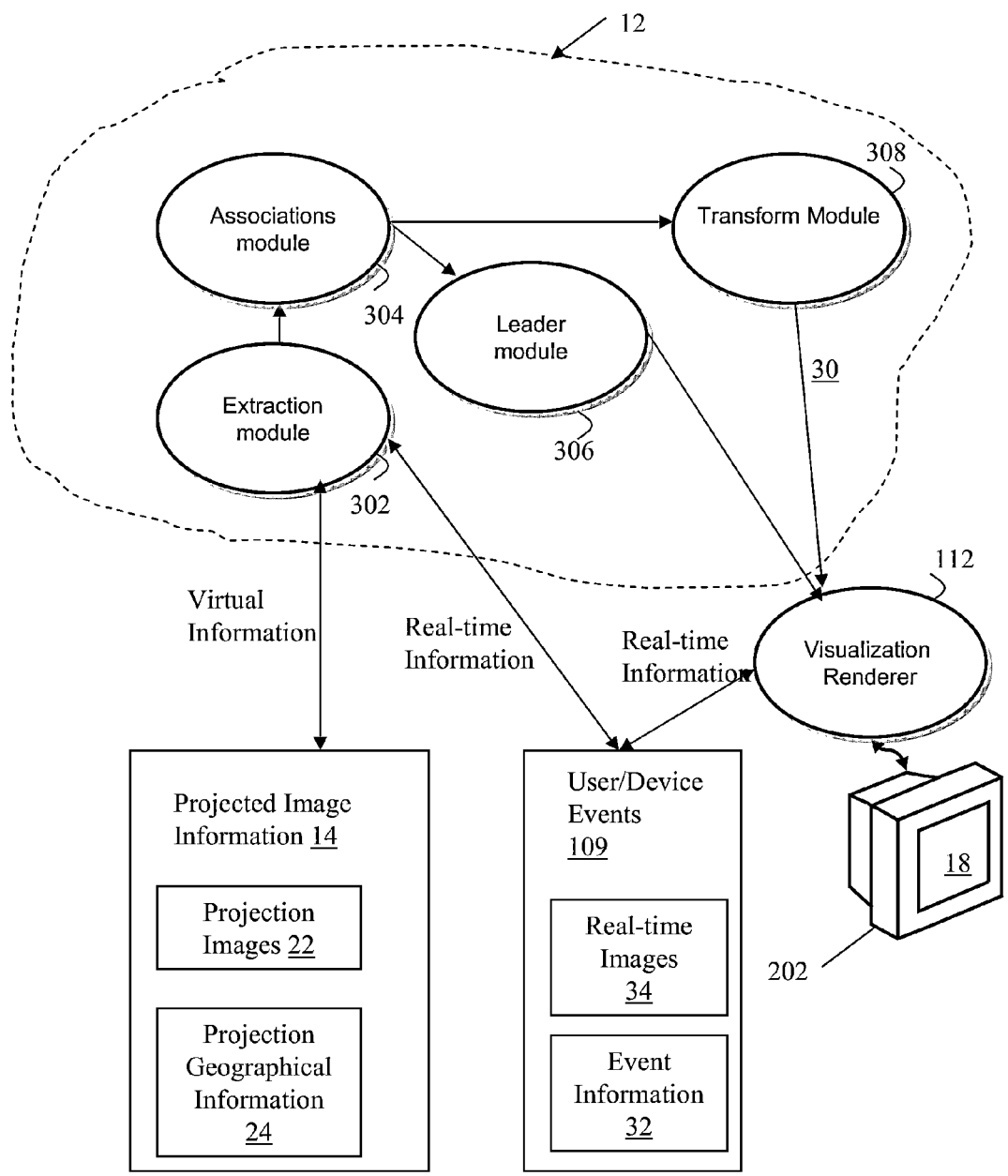
FIG. 3 is a block diagram of the visualization tool having a transform module according to an alternate embodiment.

Referring to FIG. 3, shown is a block diagram illustrating an embodiment of the visualization tool 12. In the present embodiment, the visualization tool 12 further comprises a transform module 308. The transform module 308 is configured for receiving one or more projection images 22 and for applying a transform thereto to obtain a transformed map projection image 30. The transform module 308 is configured to transform the projection image 22 such as to allow clearer visibility and usability of the projection image 22 for a user. The transform applied may depend upon the use of the image 22. For example, in some cases it may be desirable to have better viewing of objects located closer to the user while in other cases it may be more important to have emphasis on objects located farther from the user.

Once a transform is applied to the projection image 22 to obtain a transform image, the origin of the marker (i.e. 404) is computed by applying the surface deformation transform to the geo-coordinates of the object's physical location (geographical location of device 101 provided by event information 32). In one aspect, the transformed point is extruded downward with a vector annotation (i.e. as seen in FIG. 4), appearing to stop at the plane of the physical surface (i.e. extending from the projection image 22 to the real-time image 34). This stopping point on the physical surface is a perspective function of the distance from the device 101 to the physical location of the real-time object. If the 3D geometry of the physical real-time object is known, this can be used to extend the marker line from the sky to the top of the object, instead of extending all the way down to the surface plane of the real-time image 34.

Reflected Map Projection Having a Flat Surface

Figure 5A:
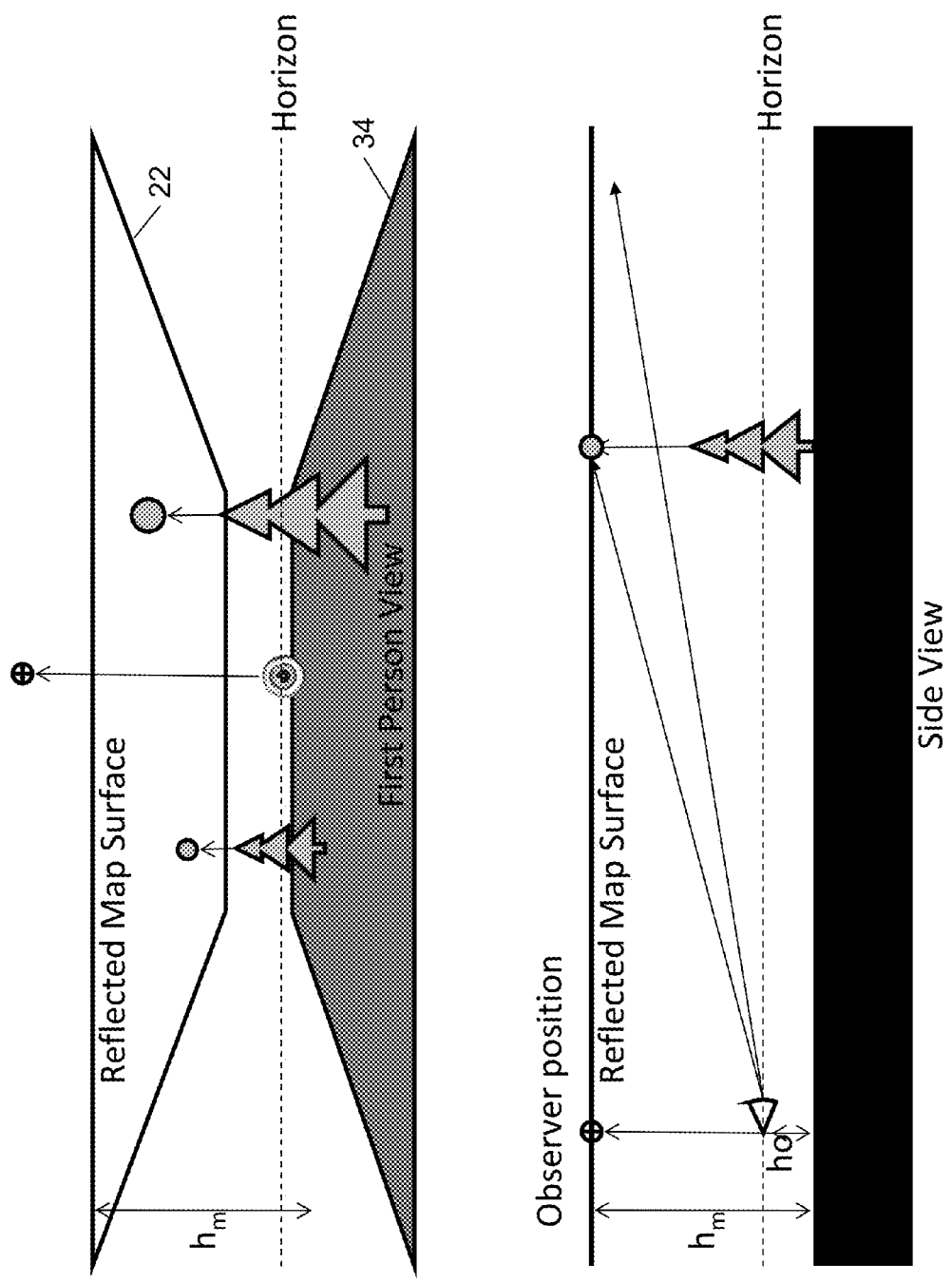
FIGS. 5A-9C are representative views depicting alternate transforms applied by the transform module of the visualization tool to the projection image according to alternate embodiments.
Figure 5B:
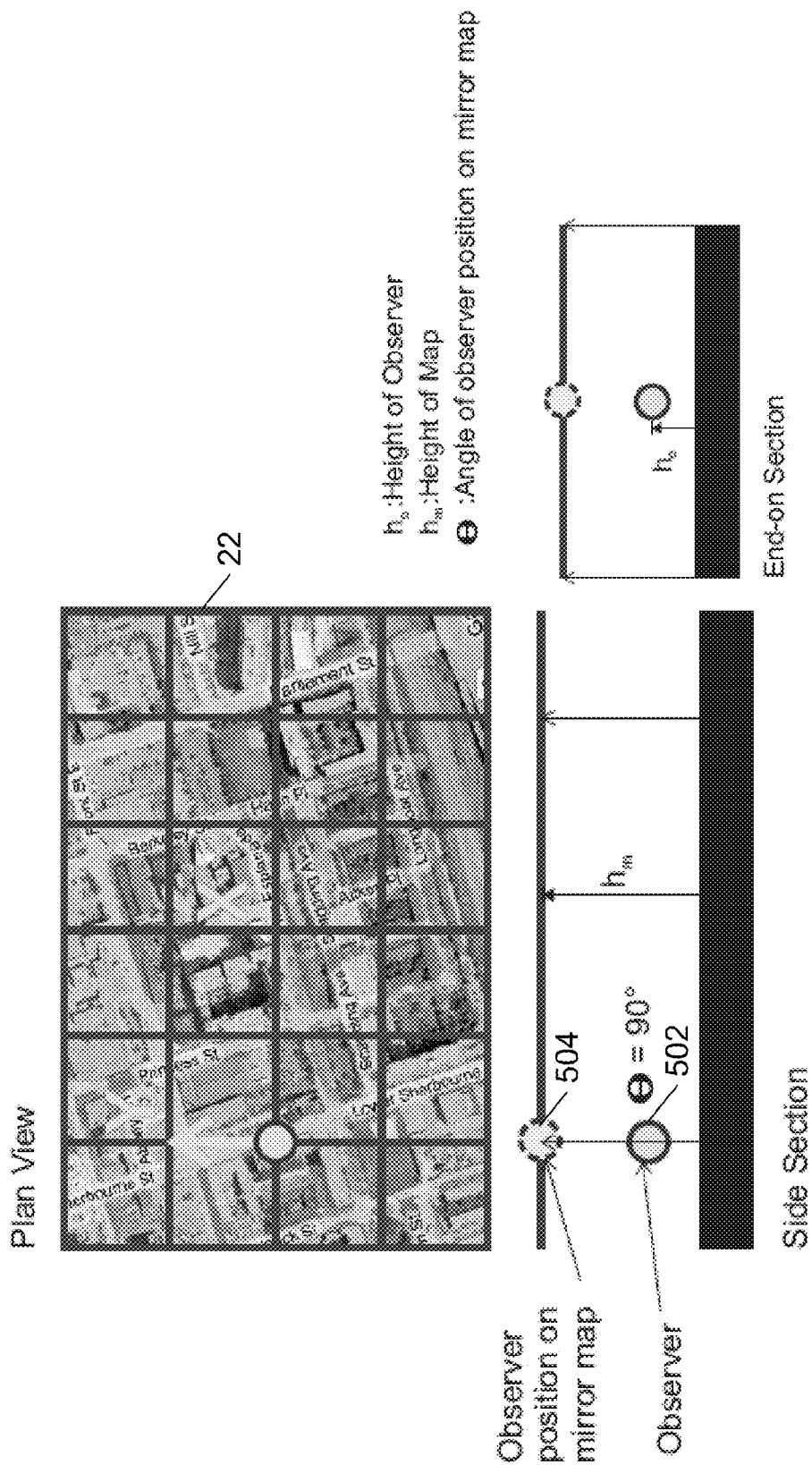

Referring to FIGS. 5A and 5B shown are examples of a projection image 22 where no transform is applied to the projection image 22. According to the present embodiment, the surface of the projection image 22 (also referred to as a reflected map surface in the figures) is a flat, planar surface such that the angle between a real-time object 502 and a virtual object 504 located above the real-time object is 90 degrees. It is noted that the term planar is also used to described a flat surface as will be understood by a person skilled in the art. In this case, the virtual object 504 is positioned directly above the real-time object 502 (i.e. a one-to-one vertical match). The present embodiment is useful for viewing a reflection of an object (i.e. a virtual object) that is located near the observer (i.e. user of the device 101). Correspondingly, in this case, it can be difficult to view virtual objects in the projection image 22 that are far from the device 101 location.

It is further noted that the flat surface of the projection image 22 refers to the surface along which the projection image is reflected or the plane where the projection image 22 lies.

Reflected Map Projection Having a Flat, Scaled, Tilted and Shifted Surface

Figure 6A:
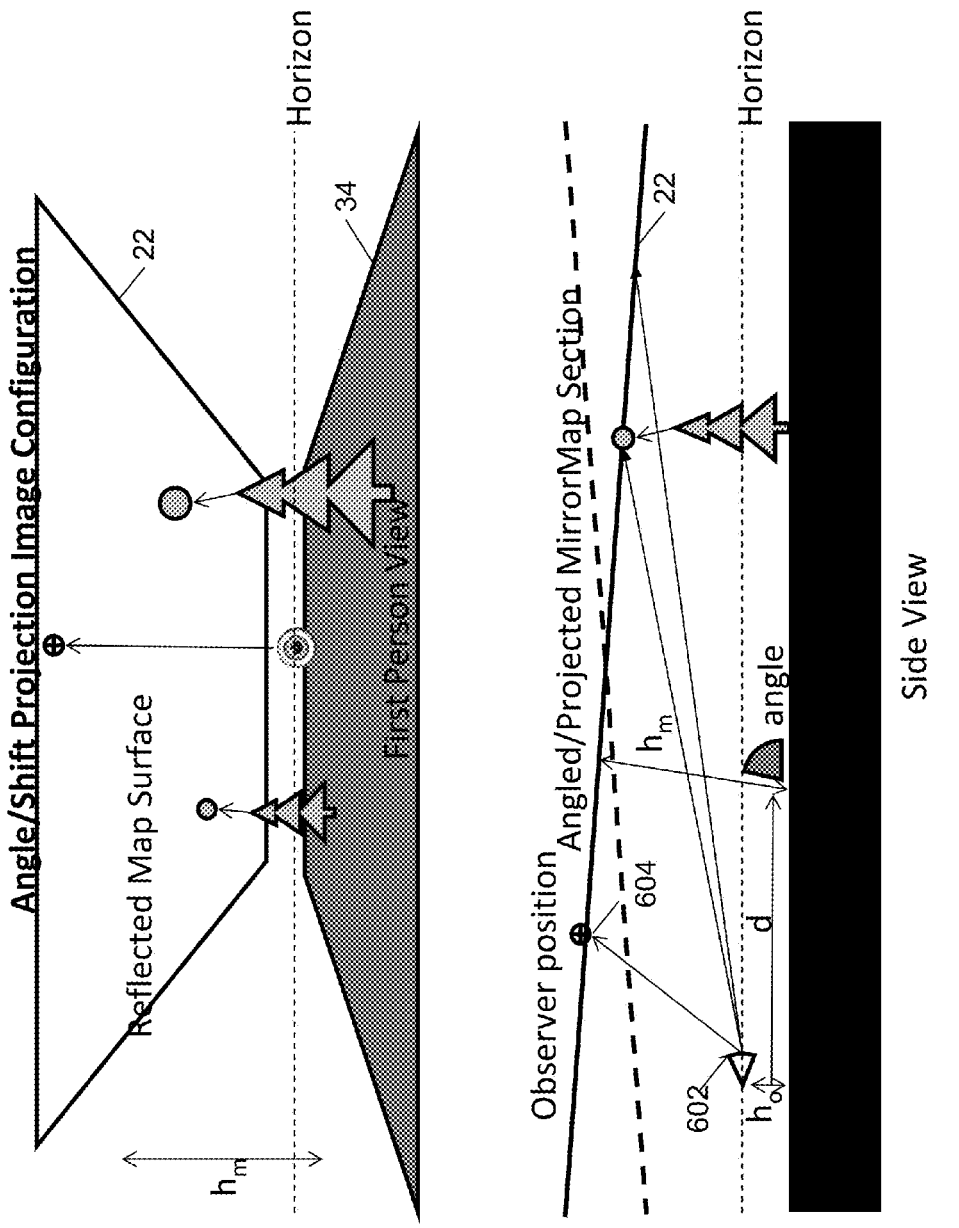
Figure 6B:
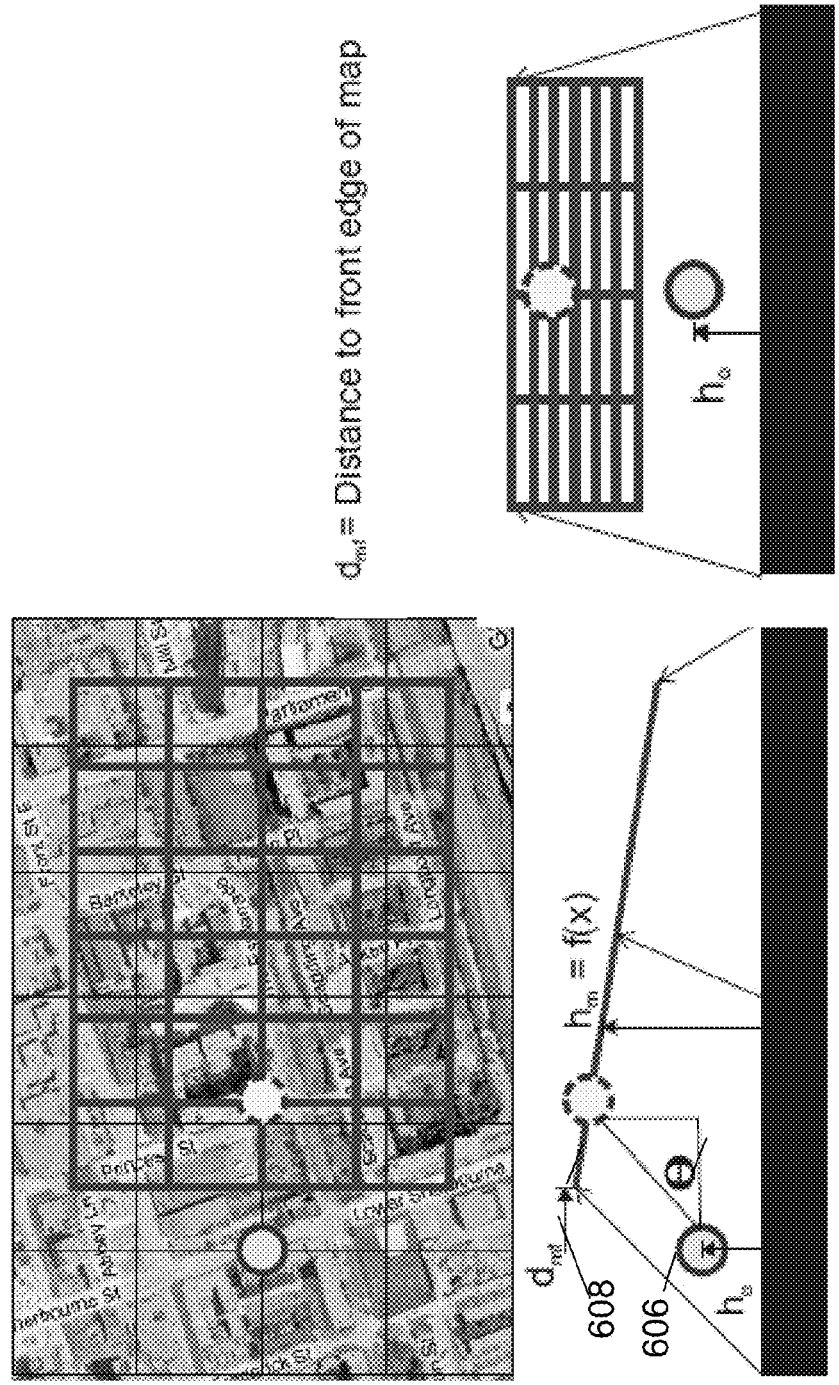

As illustrated in FIGS. 6A and 6B, in an alternate embodiment, the transform module 308 applies a slope to the plane of the projection image 22 to provide a desired viewing angle. In this way, a user of the device 101 standing a predefined location 602 can view a virtual object 604 at a pre-defined angle (i.e. the viewing angle being less than 90 degrees) such as to aid in viewing virtual objects that are positioned directly above where a user of the device 101 is standing on the ground surface. In this case, the angle of the surface of the map projection 22 allows easier reading of distant objects in the virtual plane (i.e. seen as virtual objects in the projected image 22). As illustrated in FIG. 6B, the projected image 22 may also be shifted a pre-defined distance 608 relative to the device 101 current location on the ground surface 606. Further, the virtual objects displayed in the projection image 22 may be magnified relative to real-time objects in the real-time image 34.

Reflected Map Projection Having a Curved Surface 700

Figure 7A:
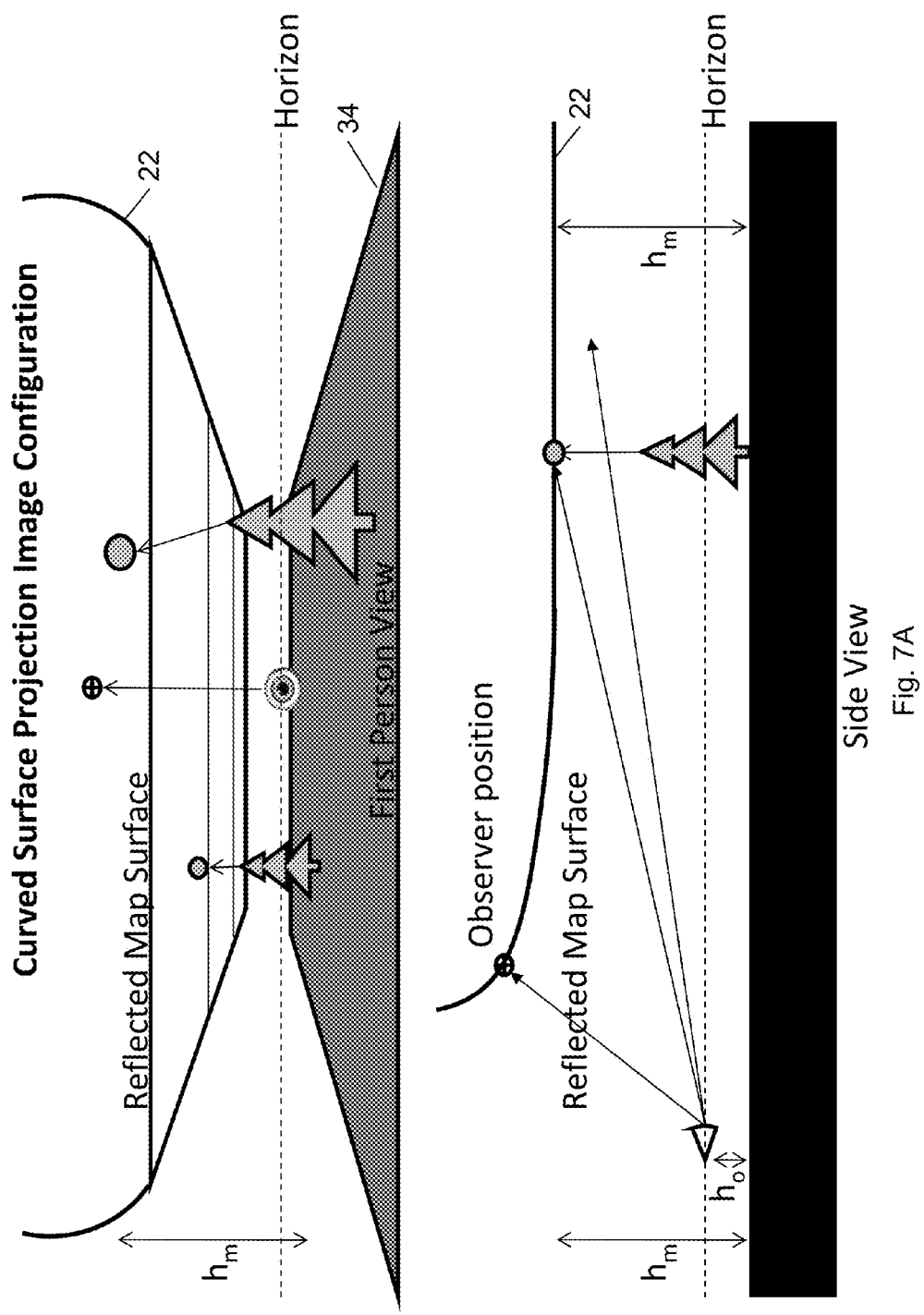
Figure 7B:
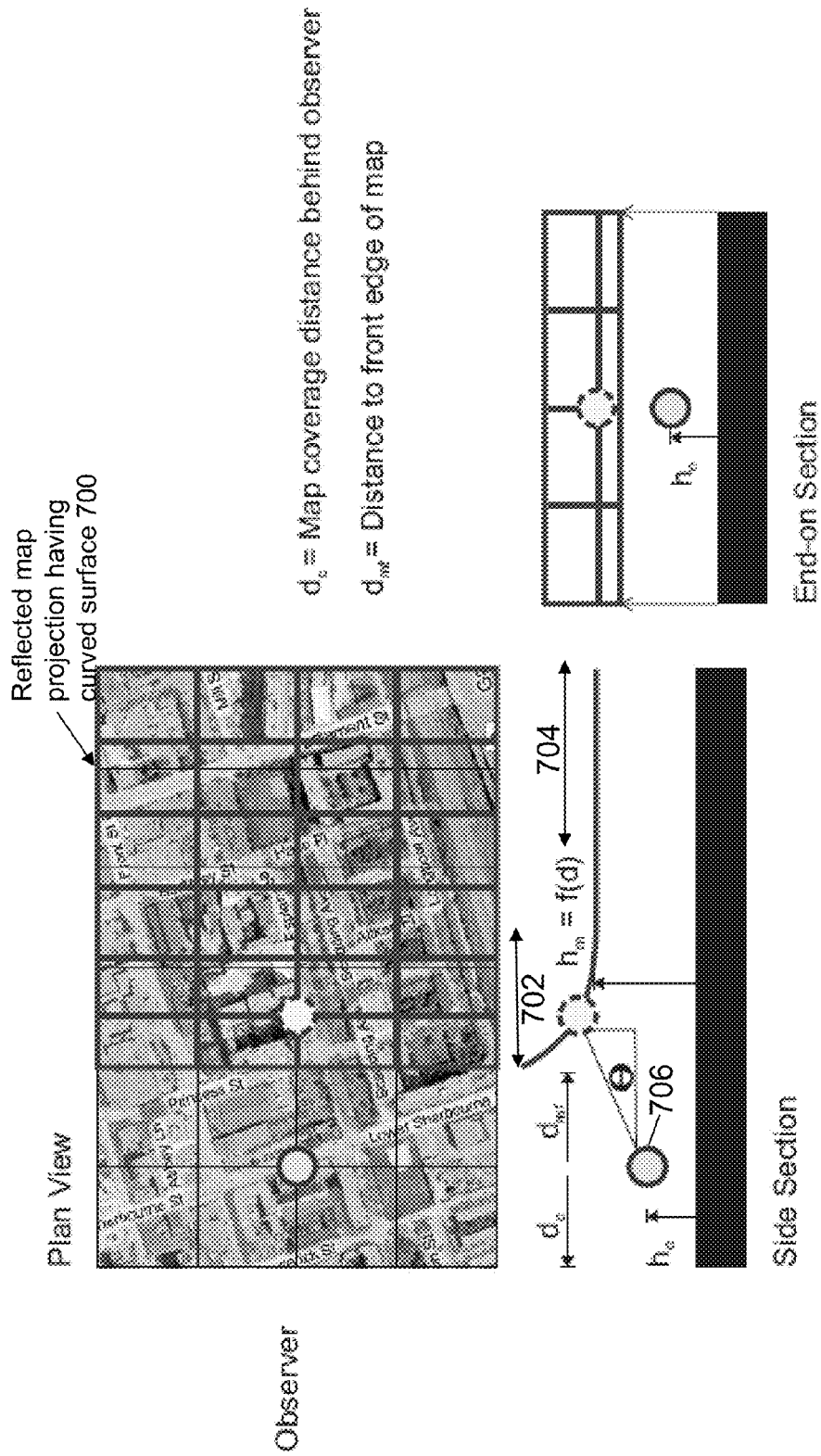

Referring to FIGS. 7A and 7B, in one embodiment, the transform module 308 applies a curve or parabolic transform to the projection image 22 such that the plane or base of projection image 22 is curved in at least one portion. This curve transform allows a user of the tool 12 to view locations near the device 101 with more clarity as it appears to stretch out at least a first portion 702 of the projected image 22 which is located close to the device 101 (i.e. location of device 101 on ground shown as 706). In the present embodiment, a second portion 706 of the projected image 22 remains flat. The second portion 706 being located farthest from the geographical location of the device 706. The height of the projection surface varies as function of the distance to the observer.

Reflected Map Projection Having a Spherical Surface 800

Figure 8:
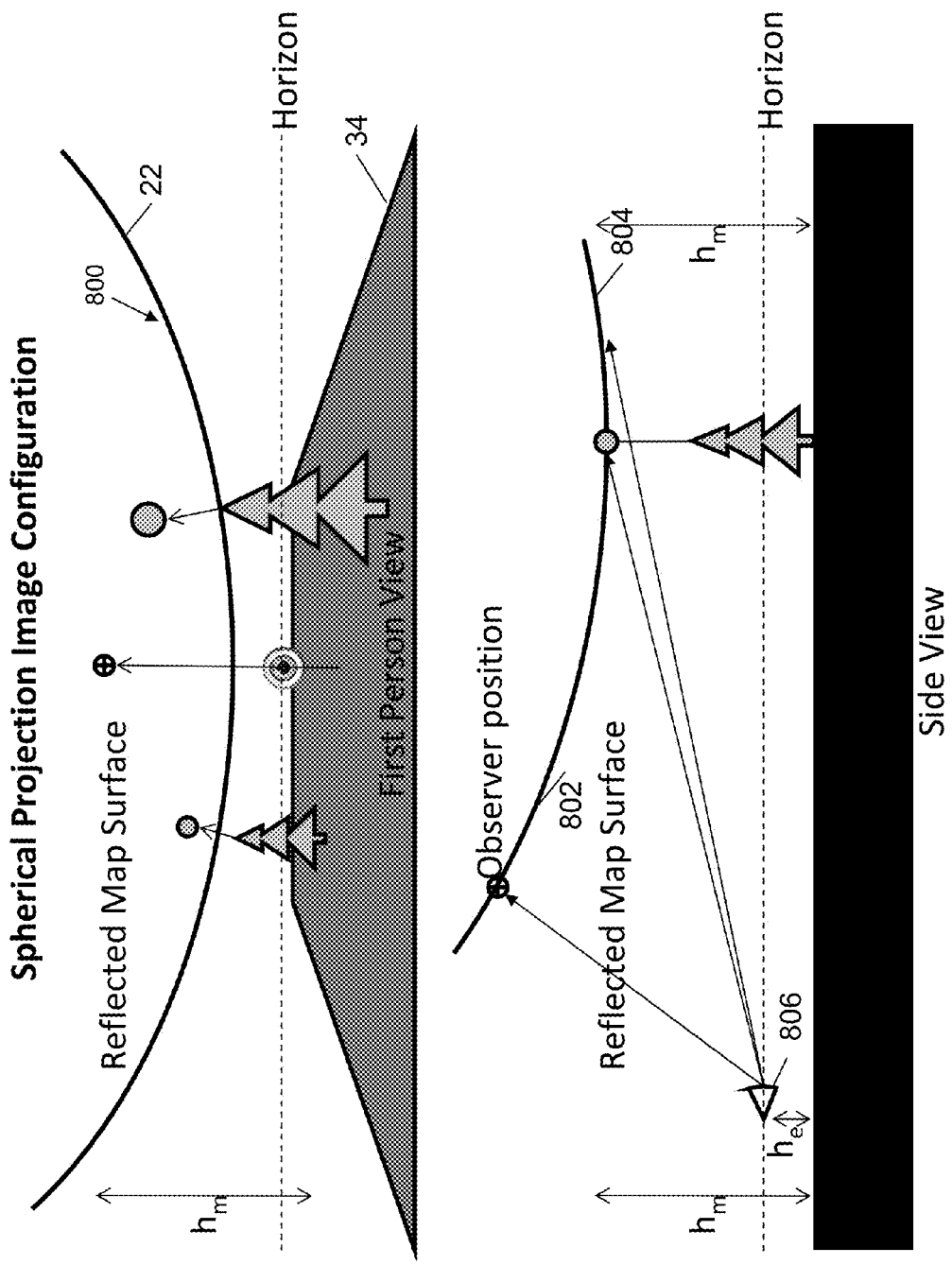

Referring to FIG. 8, in one embodiment, the transform module 308 applies a spherical transform to the projection image 22. In the present embodiment, a first portion of the projected image 802 located close to the position of the device 101 (i.e. 806) is stretched out and magnified, while a second portion of the projected image 804 located away from the device 101 is compressed. In this manner, virtual objects located near a user of the device 101 are magnified for emphasis and clarity while virtual objects located away from the user are compressed. Further the reflection of objects near the observer is located at an angle in the map projection 22 plane.

Reflected Map Projection Projected Along a Multi-Axis Curve 900

Figure 9A:
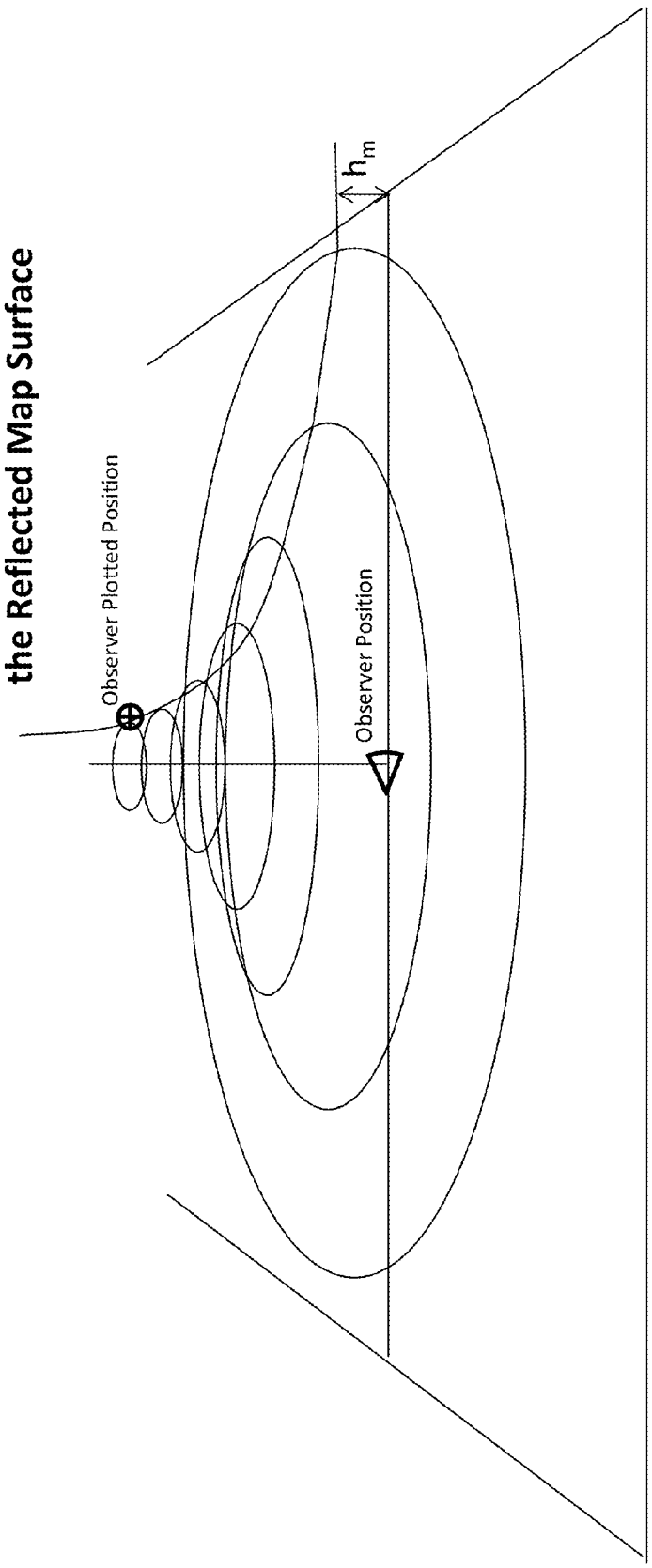
Figure 9B:
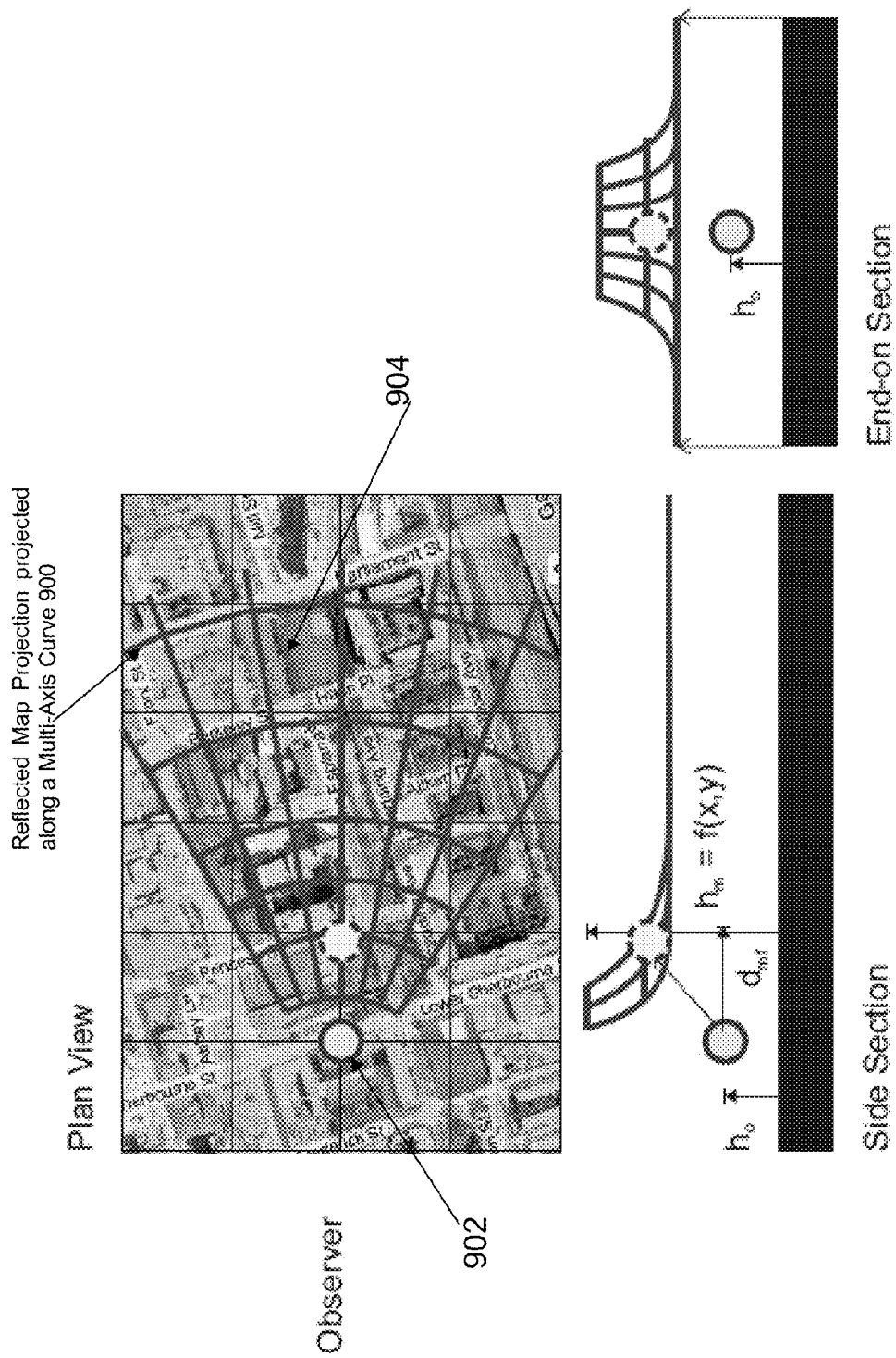
Figure 9C:
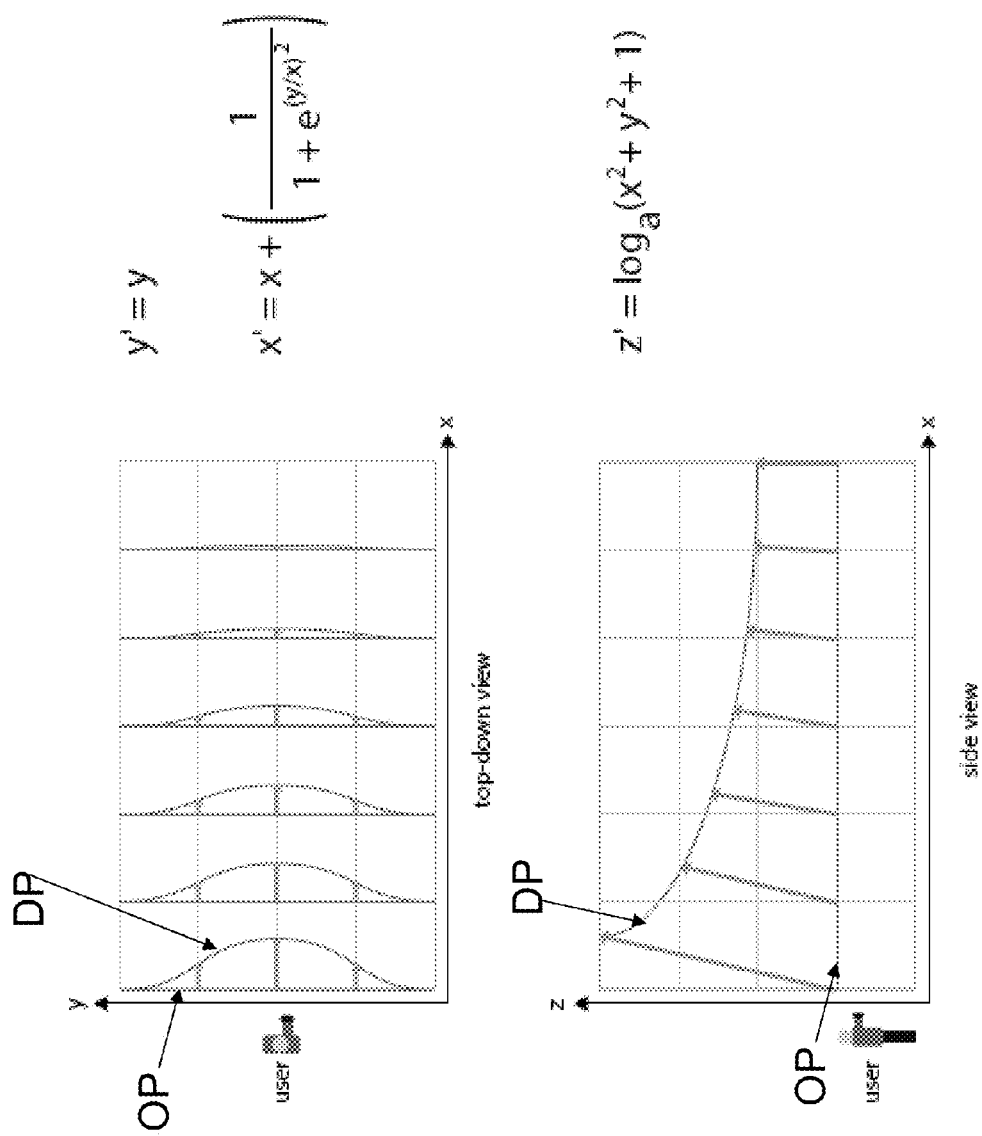

Referring to FIGS. 9A-9C, according to one embodiment, the transform module 308 applies a multi-axis curve or surface of revolution transform to the projected image 22. In the present embodiment, increased emphasis is placed on virtual objects located closest to the device's present location. That is, as shown in FIG. 9B, the virtual objects 904 located closest to the device's 101 geographical location 902 are magnified in the visual representation 18 for better viewing.

As shown in FIG. 9A, the position of the observer (user of the device 101) on the real-time image 34 is shown at element 901. The corresponding reflected image of the observer in the projection image 22 is seen as above the observer and along the axis of the surface of revolution curve as element 903.

FIG. 9C provides exemplary functions for defining the surface of revolution curve. As can be seen the surface of revolution curve is a multi-axis curve that is manipulated in the X, Y and Z axes. The equations in FIG. 9C define how the surface of the projection image 22 is deformed. For example, thinking of the surface as a mesh, each point on the mesh (i.e. each virtual object having coordinates on the projection image 22) is translated or transformed from an initial position (X,Y,Z) to its new position (X', Y', Z'). The original points prior to transformation are shown as "OP" while the transformed points are shown as "DP". Relative to a user of the device 101 viewpoint, the surface appears to curve upwards in the (X,Z) plane and also outward like a ripple effect in the (X,Y) plane.

Reflected Map Projection Having a Flat, Scale Shifted Surface 1100

Figure 11:
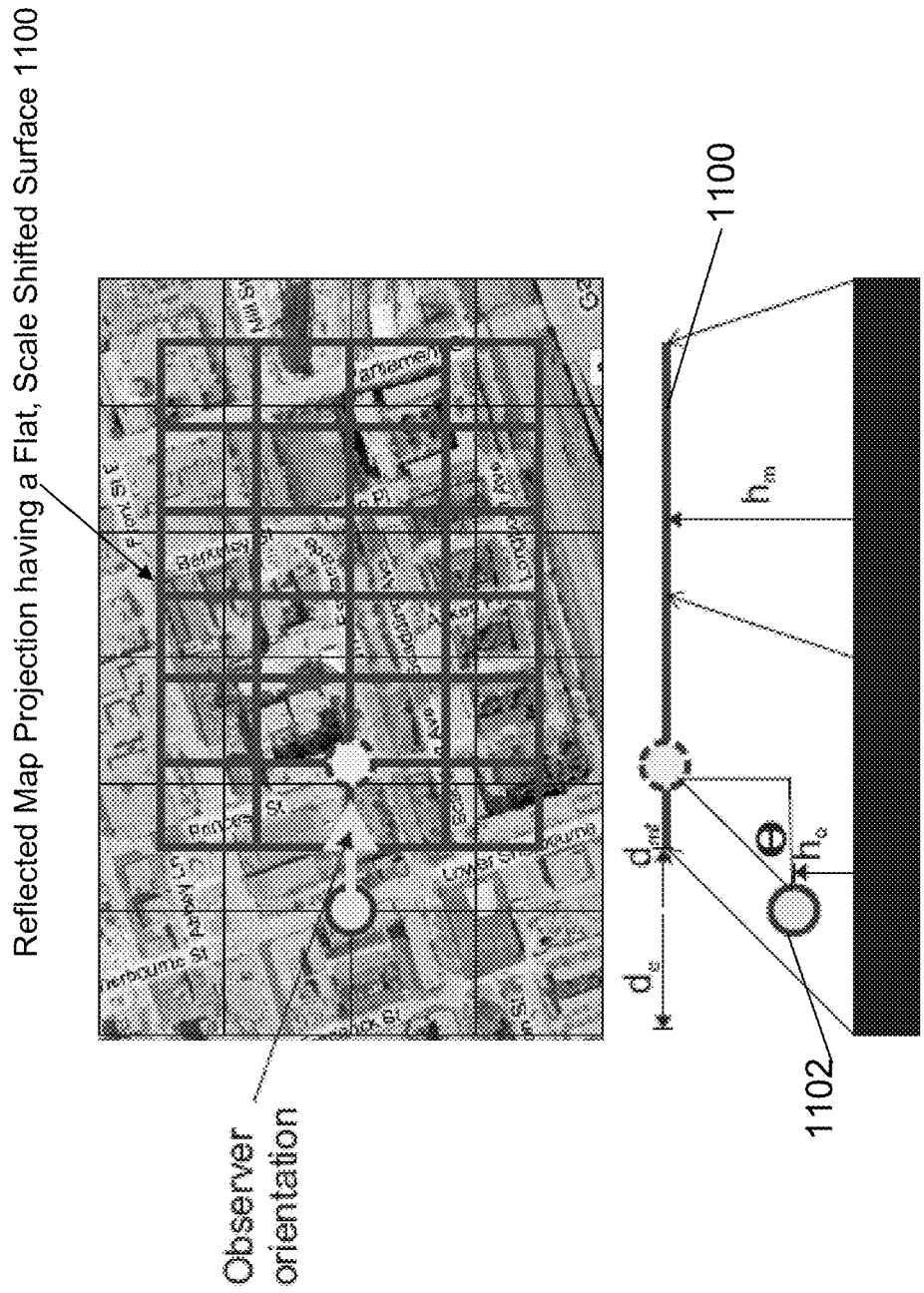
FIGS. 11-14 and 16 are representative views depicting alternate transforms applied by the transform module to the projection image according to alternate embodiments.

Referring to FIG. 11, according to one embodiment, the transform module 308 applies scaling and shifting to the flat surface of the projected image 22 to obtain a transformed image that is shifted, and scaled relative to the original projected image 22. In this case, the transformed image provides magnification of a certain portion of the viewing area of the user (i.e. the transformed image is a reflection of a certain portion of the real-time image such the virtual objects appear magnified relative to their corresponding real-time objects).

Further, the shifting allows the user to view the projected image 22 at a more desirable angle. In this case, the angle between the user of the device 1102 and the reflection of the location of the user in the transformed projection image 1100 is reduced to less than 45 degrees. According to the present embodiment, the orientation and positioning of the map projection image 22 is linked to the orientation of the user so that the projection image 22 is updated as the user changes orientation.

Reflected Map Projection with Variable Width Scaling Transform 1200

Figure 12:
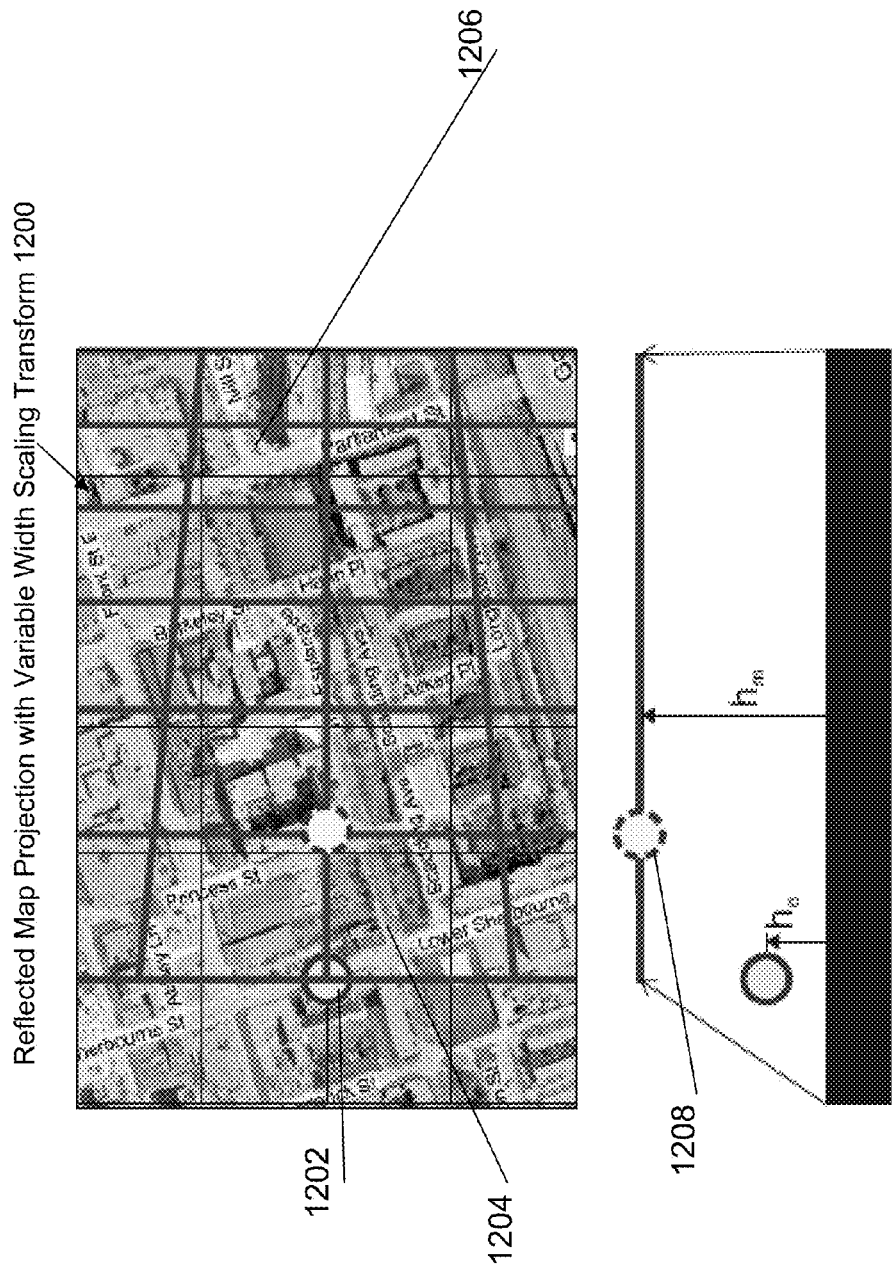

Referring to FIG. 12, according to one embodiment, the transform module 308 applies a variable width scaling to the projected image 22. In this case, the projected image 22 is scaled along the x and y axes based on the distance to the user/device 101 location 1202. That is objects located closer to the device 101 (i.e. shown as area 1204) are magnified while objects located farther from the device 101 (i.e. shown as area 1206) are compressed. This type of transform provides emphasis on local areas near the user of the device 101 and keeps the observer position 1208 on the image projection 22 in front of the user location to allow the user of the device improved readability of the image projection 22.

Reflected Map Projection with Variable Distance Emphasis 1300

Figure 13:
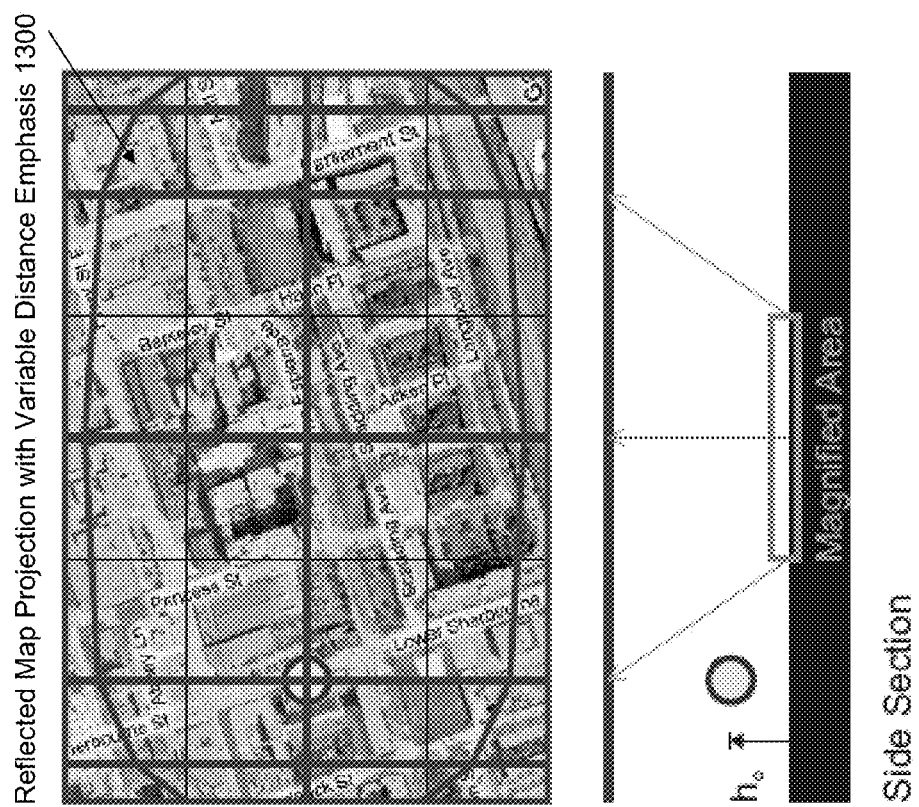

Referring to FIG. 13, according to one embodiment, the transform module 308 applies a variable distance emphasis to the projection image 22. That is, pre-defined distances and regions are magnified for better readability of beyond the horizon geography. That is, by magnifying virtual objects at pre-defined distances (i.e. magnifying virtual objects in the projected image 22), the real-time objects located beyond the horizon are brought into view on the projection image 22.

Reflected Map Projection Providing Focus on a Pre-Defined Area of the Real-Time Image 1400

Figure 14:
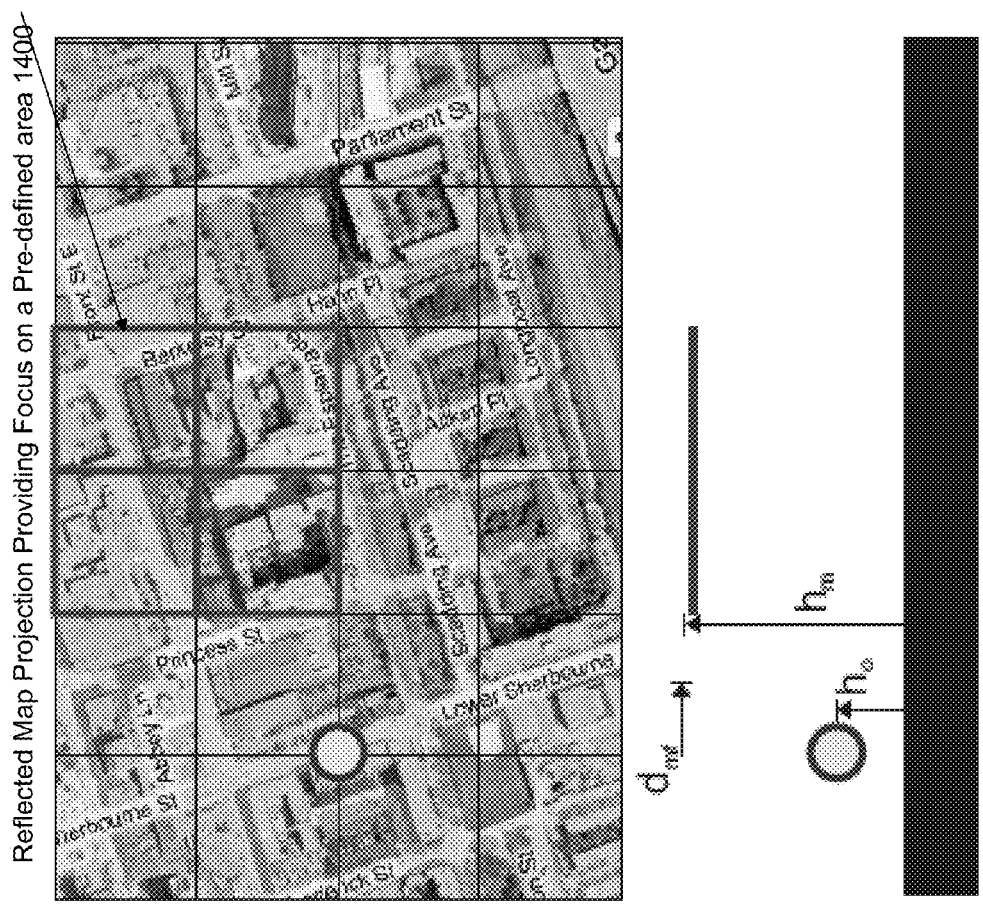

Referring to FIG. 14, according to one embodiment, the transform module 308 provides a reflected map where the reflection is based on part of the real-time image 34. That is, the projection image 22 provides a reflection of a certain pre-defined area of the real-time image 34. In this way, the projection image 22 provides partial coverage of the real-time image 34, thereby reducing clutter in the map projection image 22 and reducing the burden on the CPU of the device 101.

Reflected Map Projection as an Adaptive Function 1600

Figure 16:
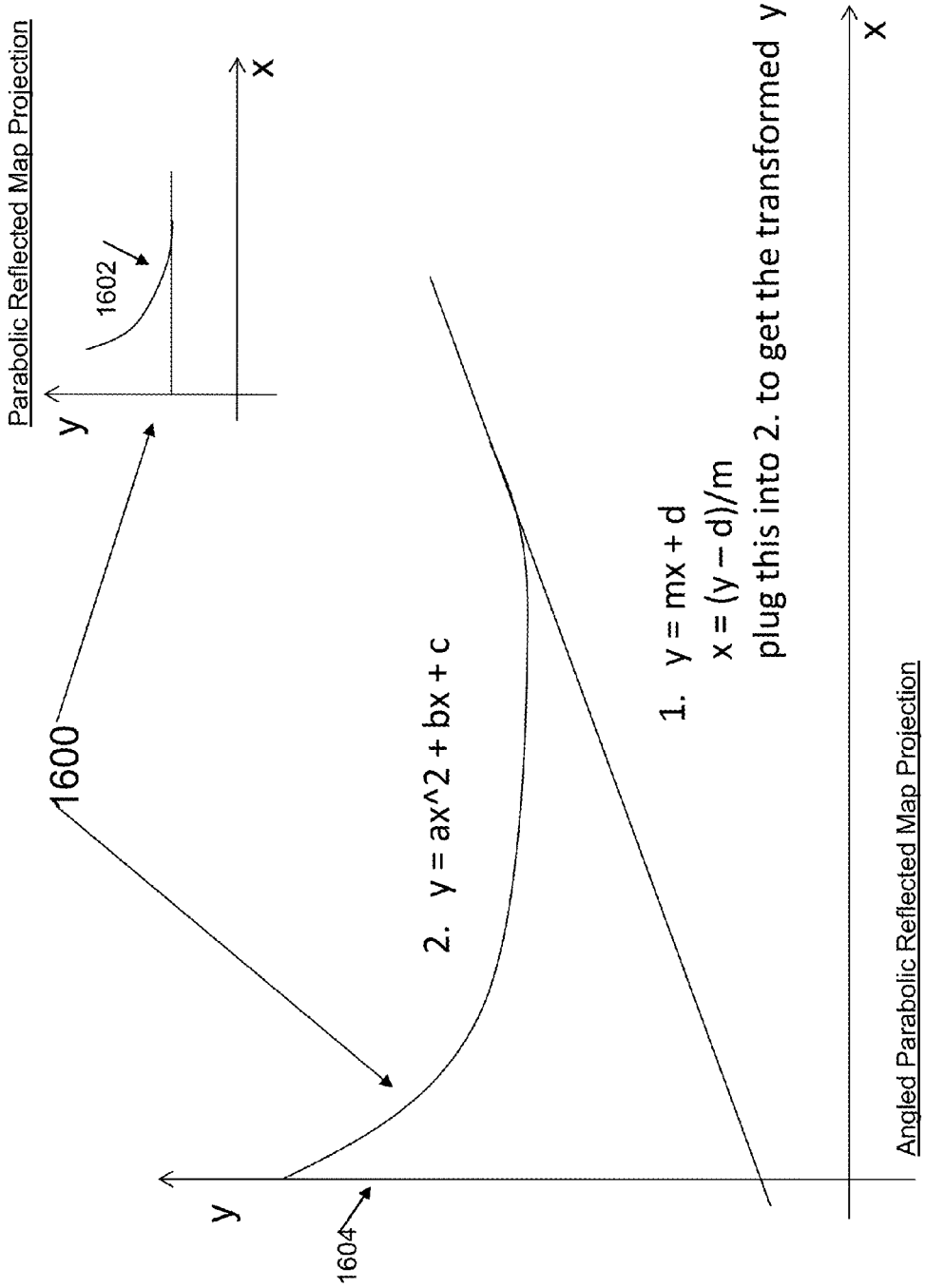

Referring to FIG. 16, according to one embodiment, the transform module 308 applies a quadratic function transform to the projection image 22. The quadratic function results in a transformed projection image 22 having of one or more curved portions such as a parabola. The quadratic function transform in FIG. 16 may be adaptive depending upon the observer (i.e. user of the device 101) viewing angle. That is, as the device 101 viewing area (i.e. dependent upon the viewing angle and direction facing) of the device changes, the quadratic function and thus the shape of the parabola is updated to allow clearer visibility and usability of the projection image 22.

Although preferred embodiments of the invention have been described herein, it will be understood by those skilled in the art that variations may be made thereto without departing from the spirit of the invention or the scope of the appended claims.

What is claimed is:

1. A method for creating and displaying a transformation of a map projection of a device's real-time viewing area to depict virtual objects, the virtual objects providing a reflected view of real-time objects displayed within the device's viewing area, the method comprising:

displaying a real-time image of the device's viewing area taken from a geographical location on a display screen of the device;

determining the map projection for revealing, the reflected view as an elevated view of a ground surface about the device's current geographical location and in accordance with the device's viewing area;

transforming the map projection by applying one of: a curved surface transform to the map projection such that the curvature of the curved surface is adaptive to a change in a viewing angle of the device and scaling the map projection along two separate axes in dependence upon a distance of the virtual object in the map projection to the geographical location of the device;

superimposing the transformed map projection on the display screen and overlaid in an upper portion of the real-time image; and defining one or more markers configured to show a relationship between the transformed map projection and the real-time image, each marker overlaid on the display and configured to connect between the virtual object in the transformed map projection and the corresponding real-time object on the real-time image.

2. A method according to claim 1, further comprising:
providing a user interface configured to interact with a user of the device for allowing one or more of selecting virtual objects, zooming, panning, drilling down on the transformed map projection, changing shape of the transformed map projection surface, adjusting transparency of the transformed map projection, and adjusting height of the transformed map projection surface.

3. A method according to claim 1, further comprising:
if the map projection is transformed by applying a curved surface, the curved surface includes at least one portion with a convex shape for magnifying virtual objects within the map projection that are located close to the device and compressing virtual objects located away from the device.

4. A method according to claim 1, wherein the transformed map projection is positioned directly above the real-time image to provide a vertical correspondence between each virtual object and corresponding real-time object.

5. A method according to claim 4, further transforming the map projection by shifting the map projection and scaling thereof relative to the real-time image to provide a transformed image, the transformed image configured to provide magnification of at least a portion of the real-time image.

6. A method according to claim 1, further comprising the step of applying a slope to the transformed map projection to obtain a tilted transformed image, the tilted transformed image configured to depict the virtual objects at an angle relative to the corresponding real-time objects.

7. A method according to claim 1, wherein the transformed map projection is further transformed by magnifying virtual objects corresponding to real-time objects located at a predefined distance from the device's geographical location.

8. A method according to claim 1, wherein the transformed map projection displays virtual objects corresponding to a subset of real-time objects within the device's viewing area to provide a partial reflection of the real-time image.

9. A method according to claim 1, wherein the one or more markers are defined by colour coding a selected one of the virtual objects to correspond to a colour of a corresponding one of the real-time objects.

10. A method according to claim 1, wherein the transformed map projection is a vector image providing a symbolic reflection of real-time objects as corresponding virtual objects.

11. A method according to claim 2, wherein the user interface is further configured to interact with a user to allow placement and modification of at least one of the one or more markers, annotations, vectors, and symbols each configured for defining a relationship between the transformed map projection and the real-time image.

12. A method according to claim 1, wherein the transformed map projection being superimposed on the display screen is one of semi-transparent or transparent image to allow visibility of the upper portion of the real-time image.

13. A method according to claim 1, further comprising the step of determining the upper portion of the real-time image for overlaying the transformed map projection thereon, wherein determining the upper portion comprises determining a portion of the real-time image having a least number of real-time objects.

14. A method according to claim 1, further comprising the step of receiving physical characteristic information of at least one of the real-time objects, wherein each marker extends between the virtual object and a top surface of the corresponding real-time object in accordance with the physical characteristic information of the corresponding real-time object.

15. The method of claim 1, wherein the markers are configured to show a visual relationship linking the displayed transformed map projection and the real-time image such that the displayed transformed map projection and markers are configured for assisting in visual navigation.

16. The method of claim 1, wherein determining the map projection is based upon retrieving satellite and/or aerial imagery information for use in determining the reflected view.

17. The method of claim 1, wherein the real-time image and at least one of the transformed map projection, and the markers are updated in response to user events related to the device comprising at least one of a change of location, positioning and angle of the device's viewing screen.

18. A system for creating and displaying a transformed map projection of a device's real-time viewing area to depict virtual objects, the virtual objects providing a reflected view of real-time objects displayed within the device's viewing area, the system comprising:

a visualization renderer for displaying a real-time image of the device's viewing area taken from a geographical location on a display screen of the device;

an extraction module for retrieving the map projection for revealing the reflected view as an elevated view of a ground surface about the device's current geographical location and in accordance with the device's viewing area, the extraction module coupled to the visualization renderer for superimposing the map projection on the display screen and overlaid in an upper portion of the real-time image;

an associations module coupled to the extraction module for defining one or more markers configured to show a relationship between the map projection and the real-time image;

a transform module coupled to the associations module, the transform module configured to apply a transformation to the map projection to obtain a transformed map projection by applying one of: a curved surface transform to the map projection such that the curvature of the curved surface is adaptive to a change in a viewing angle of the device and scaling the map projection along two separate axes in dependence upon a distance of the virtual object in the map projection to the geographical location of the device; and a leader module coupled to the associations module and the transform module for connecting each marker between the virtual object in the transformed map projection and the corresponding real-time object on the real-time image, the leader module communicating with the visualization renderer for overlaying each marker on the display screen on top of the real-time image and the transformed map projection.

19. The system according to claim 18, wherein if the map projection is transformed by applying a curved surface, the curved surface includes at least one portion with a convex shape for magnifying virtual objects within the map projection that are located close to the device and compressing virtual objects located away from the device.

20. The system according to claim 18 wherein the transform module is further configured to apply a slope to the transformed map projection to obtain a tilted transformed image, the tilted transformed image configured to depict the virtual objects at an angle relative to the corresponding real-time objects.

* * * * *